United States Patent [19]

Stiffler et al.

[11] Patent Number: 4,608,631
[45] Date of Patent: Aug. 26, 1986

[54] MODULAR COMPUTER SYSTEM

[75] Inventors: Jack J. Stiffler, Concord; Richard A. Karp, Bedford; James M. Nolan, Jr.; Michael J. Budwey, both of Holliston; David A. Wallace, Chelmsford, all of Mass.

[73] Assignee: Sequoia Systems, Inc., Marlborough, Mass.

[21] Appl. No.: 672,799

[22] Filed: Nov. 19, 1984

Related U.S. Application Data

[63] Continuation of Ser. No. 414,961, Sep. 3, 1982, Pat. No. 4,484,273.

[51] Int. Cl.⁴ .............................................. G06F 15/16
[52] U.S. Cl. .................................................... 364/200
[58] Field of Search ................. 364/200 MS File, 200

[56] References Cited

U.S. PATENT DOCUMENTS 4,214,305  7/1980  Tokita et al. ....................... 364/200
4,426,681  1/1984  Bacot et al. ......................... 364/200

*Primary Examiner*—Raulfe B. Zache
*Attorney, Agent, or Firm*—Wolf, Greenfield & Sacks

[57] ABSTRACT

A multi-processor computer system is disclosed in which processing elements, memory elements and peripheral units can be physically added and removed from the system without disrupting its operation or necessitating any reprogramming of software running on the system. The processing units, memory units and peripheral units are all coupled to a common system bus by specialized interface units. The processing elements are organized into partially independent groups each of which has dedicated interface units, but the processing units share system resources including peripherals and the entire memory space. Within each processing element group at any one time, group supervisory tasks are performed by one of the processors, but the supervisor function is passed among the processors in the group in a sequence to prevent a fault in one processor from disabling the entire group. Communication between groups is accomplished via the common memory areas.

The transfer of the supervisor function from processor to processor is performed by registering the supervisor's identity in a common area in one of the dedicated interface units which area is accessable to all processors in the associated group and using program interrupts generated in the common interface unit to communicate between group processors.

Access to the common system bus by the processing elements is controlled by the associated interface units by means of a combination serial/parallel arbitration scheme which increases arbitration speed without requiring a full complement of request/grant leads.

24 Claims, 16 Drawing Figures

Fig.4

A: X = DONT CARE
6/5 = LEVEL 6/LEVEL 5 *
P13-PI0 = PE ID 3-0

B: R15-R00 = EXECUTIVE PROCESSOR REQUEST FROM PE 15-00
VLE = VALID EXECUTIVE
6/5 = LEVEL 6/LEVEL 5 *
P13-PI0 = PE ID 3-0

C: R15-R00 = BUS ACCESS REQUEST FROM PE 15-00
ID7-0 = EXTERNAL INTERRUPT DEVICE ID 7-0
IV3-0 = EXTERNAL INTERRUPT VECTOR 3-0
LV1-0 = EXTERNAL INTERRUPT LEVEL 1-0

D: V23-V07 = VIRTUAL ADDRESS BITS 23-07
R/C = REQUEST/COMPLETE
P13-PI0 = PE ID 3-0
X = DONT CARE

E: P12-P31 = PHYSICAL ADDRESS BITS 31-12
X = DONT CARE
R/C = REQUEST/COMPLETE *
P13-PI0 = PE ID 3-0

SHEET 1

SHEET 2

SHEET 1

SHEET 2

MODULAR COMPUTER SYSTEM

This application is a continuation of application Ser. No. 414,961, filed 9-3-82, now U.S. Pat. No. 4,484,273.

FIELD OF THE INVENTION

This invention relates to data processing systems and, in particular, to multi-processor data processing systems whose configuration can be changed by adding or subtracting modular units.

BACKGROUND OF THE INVENTION

Most research facilities and many businesses and industries presently use data processing systems in order to handle information processing needs ranging from very simple bookkeeping operations to the control of very complex processes.

Typically, such institutions purchase the original data processing equipment when they are either small or their data processing needs are unsophisticated. In such an initial stage a small data processing system with relatively few capabilities often serves to satisfy the user's needs. However, as the data processing user grows in size or his needs become more sophisticated and complex, it is desirable that his initial data processing system can be modified and expanded to fit the user's expanding data processing needs.

In order to accommodate growth and changing data processing needs, many prior art data processing systems have been designed with a base system that can be either expanded or altered in order to tailor the system to the customer's needs. The type of modification or expansion which is required depends on the particular needs and functions required by each individual user. Some users may require increased memory size while others require increased processing speed. While many prior art computer systems have been designed to provide for expansion and modification in some aspects most prior art designs sacrifice some aspects of performance or require greatly increased costs in order to provide such flexibility.

For example, most present day data processing systems have the capability of expanding system memory by physically inserting additional memory circuit boards. During the memory installation procedure, internal manual switches are set to inform the computer that additional memory has been added. This simple design satisfactorily provides for expansion of memory size but may also require a rewrite of the user's software programs to accomodate the added memory. In addition, memory size expansion is limited by the size of the address word used in the system. When the memory reaches the largest size capable of being addressed by address word, it becomes necessary to replace the computer circuitry with new or additional circuitry which can utilize a larger address word length. Such a circuitry change often involves a significant cost and usually also necessitates a rewrite of the user's software programs. The cost and time delay involved in the latter operation may make such change unfeasible.

Even in systems in which memory size can be expanded significantly, however, the overall processing speed of the entire system may be limited by the speed of the processing element itself. In order to increase processing speed, many prior art systems have been designed with specialized high-speed logic circuitry which performs repetitive, time-consuming functions such as input/output processing and address translations. Even with such special high-speed hardware, however, processing time eventually becomes limited by the processing speed of the single processor.

In order to increase total processing speed further, prior art multi-processor systems have been developed. These systems typically consist of a number of separate computer systems, each with its own separate processor and memory tied together by a common system bus. In this type of system some or all of the processing units may be involved in the solution of a single problem or the units may be involved in the solution of several problems simultaneously. Typically, in order to coordinate the operation of the separate processors, a fixed "executive" processor controls the overall or global system functions to prevent conflict. The introduction of a fixed executive processor itself causes additional problems because as the capability of the system expands eventually this processor becomes overloaded with executive functions. If two exeutive processors are used in a system then a complicated scheme must be developed in order to divide responsibilities between the executive processors. In addition, a single failure in the executive processor effectively stops the operation of the whole system since executive functions must be performed continually in order to assure reliable system operation.

Accordingly it is an object of the present invention to provide a multi-processor computer system which does not have a fixed executive processor.

It is another object of the present invention to provide a modular computer system to which processing elements, memory elements and input/output peripheral units can be added or removed in order to tailor the system to the user's data processing needs.

It is yet another object of the present invention to provide a modular computer system in which modules can be added or removed without necessitating any special user programming.

It is yet another object of the present invention to provide a modular computer system in which modules can be added or removed without requiring a large amount of additional electronic circuitry which performs the executive function.

It is yet another object of the present invention to provide a modular computer system in which modules can be added or subtracted without adversely affecting the overall throughput of the system.

It is yet a further object of the invention to provide a modular computer in which failure of an executive processor does not destroy overall system operation.

SUMMARY OF THE INVENTION

The foregoing objects are achieved and the foregoing problems are solved in one illustrative embodiment of the invention in which a plurality of identical processing elements are connected to a single system bus which is, in turn, connected to a plurality of memory elements and peripheral units. The processing elements are arranged in groups which are connected to a common processor bus. The processor bus, in turn, is connected to the system bus by means of dedicated master interface units. Similarly, the memory and peripheral units are divided into corresponding groups which share a common memory bus. Each memory bus communicates with the system bus by means of dedicated slave interface units.

Within a processor group, the processing elements do not have dedicated memory spaces but, instead, share the total memory space in the associated group thereby providing for efficient resource allocation. The control and resource allocation functions within a processor group are performed by one "executive processor" at any one time. The executive function is shared among all processing elements on a rotating basis between each of the processors. The identity of the executive processor is determined by a code stored in a register in the master interface unit which connects all processing elements in a processor group to the system bus.

Communication between processor groups is carried out by utilizing common memory areas. Specifically, an executive processing element in one processing element group can request service from another processing element group by writing a request in a specified area of the common memory. The same memory location is subsequently read by the executive processing element serving the group from which service is requested. After the requested service has been performed, information is transferred in the reverse direction by a similar exchange of messages via the common memory area.

More specifically, processing elements within a group communicate by using common registers in the common master interface circuit and controlling the master interface circuit to generate processor interrupts. For example, the current executive processing element passes the executive function to another processing element by storing the identification number of the designated processing element in a common register in the master interface unit along with a information causing the master interface circuitry to generate an interrupt which notifies the new executive that an executive transfer is about to occur.

According to another aspect of the invention, only processing elements can assume control of the processor and system buses even in the case of direct memory transfers from secondary storage to main memory. This arrangement simplifies the bus arbitration circuitry.

More particularly, when a processing element is granted access to a bus it monitors the bus control lines to determine when the bus actually becomes available. As soon as the bus becomes available the processing element sends the address of the memory element or peripheral unit to which it requests access over the bus and a code indicating the amount of data to be transferred. The processing element then waits for the addressed element or unit to generate an acknowledge signal. When it receives the acknowledgement signal, it transmits or receives a block of data whose length was previously specified.

Advantageously, even on transfers taking place directly between secondary storage and main memory, the processing element controls bus access. Specifically, on such direct transfers, after sending a first address, the processing element waits for the acknowledge signal and then sends a second address and data length information to a second element or unit. The first address identifies the data destination and the second address identifies the data source. Once both addresses have been acknowledged, data transfer continues directly between the elements or units. In accordance with the invention, if a direct transfer occurs between a memory element and peripheral unit located on the same memory bus, the processor bus and system bus become available for use by other processing element as soon as the second DMA address has been acknowledged, thus significantly increasing bus capacity.

In accordance with yet another aspect of the invention, processing elements compete for access to the buses by a unique serial/parallel arbitration scheme which combines the speed advantages of a fully parallel arbitration scheme which the circuit simplicity of a serial arbitration scheme.

In accordance with a further aspect of the invention, bus access requests generated by the processing elements are "pre-granted" in that a decision as to the processing element that will be granted bus access is made before the bus actually becomes available. Therefore, no time is wasted in request arbitration while the bus is available.

More particularly, each processing element is assigned to a "bus access group". Each bus access group contains up to four processing elements. If there are only four processing elements present in the system one bus access group is used. If there are five to eight processing elements associated with the computer system, two bus access groups are used. For more than eight processing elements, four bus access groups are used. Each bus access group is, in turn, assigned a polling interval or "time slot" during which the processing elements associated with that bus access group make bus access requests to the master interfaces.

A processing element generates bus access requests by placing a signal on a bus access request lead permanently assigned to that processing element. However, since there are only four processing elements assigned to each bus access group, at most only four such bus access request lines are necessary. Therefore, all processing elements make bus access requests utilizing the same four bus access request lines in cyclic polling intervals or time slots.

BRIEF DESCRIPTION OF THE DRAWINGS

FIG. 4 shows the arrangement of information in selected registers in the master interface;

DETAILED DESCRIPTION OF THE INVENTION

Figure 1:
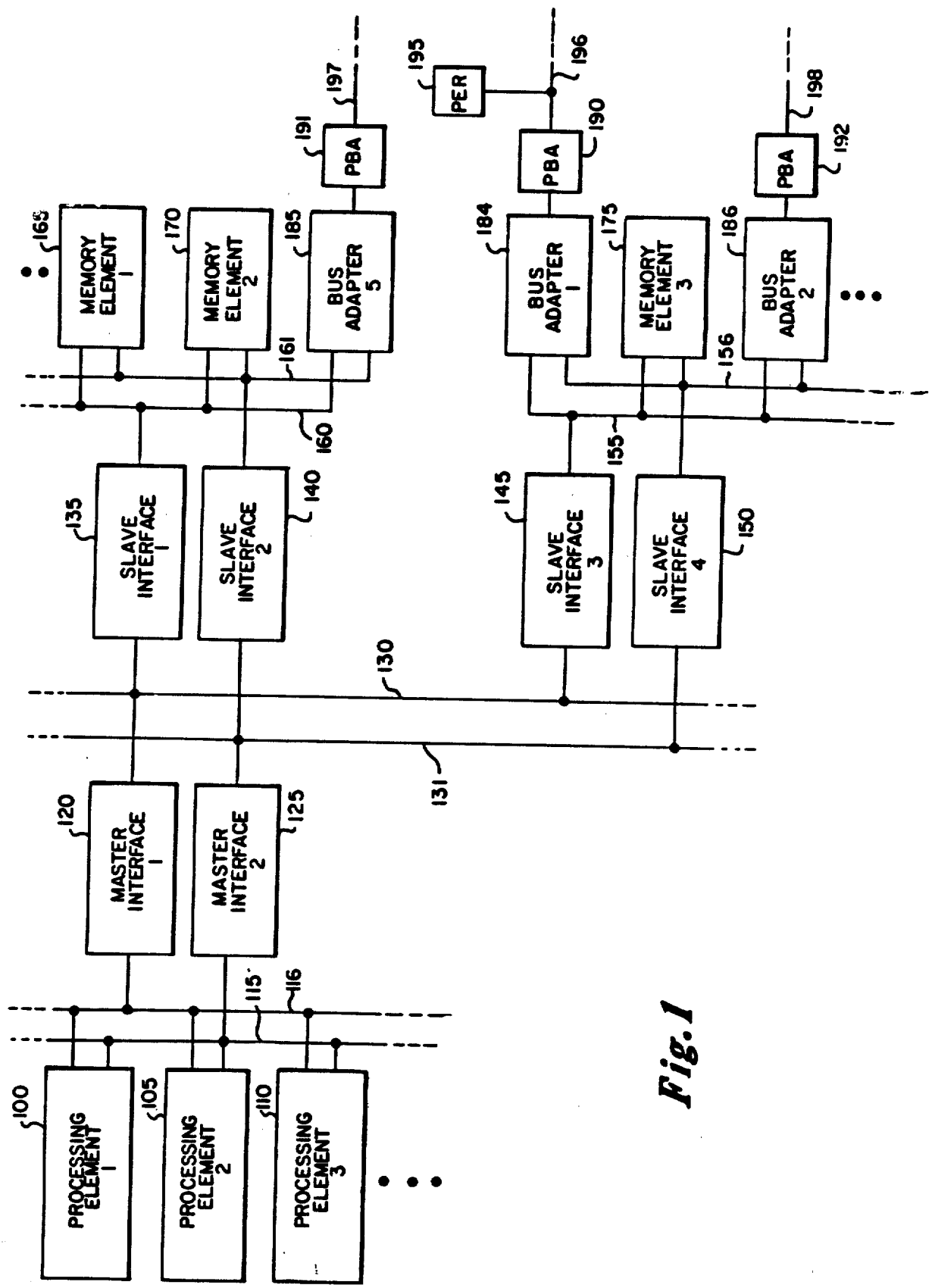
FIG. 1 of the drawings shows a block schematic diagram of the overall modular computer system arrangement.

As shown in FIG. 1, the illustrative modular computer system is comprised of three main elements; processing elements, memory elements and peripheral elements. All of the elements are connected to common system buses 130 and 131. Only one system bus is necessary for system operation, but two buses are preferred to prevent a malfunction in one bus from stopping operation of the entire system and to increase throughput of the system. Similarly, for reliability and speed purposes, the interface units which connect the processing, memory and peripheral elements to the system bus are also duplicated. Buses 130 and 131, although shown as a single line, are actually multi-wire buses comprising 32 separate data lines as will be described further herein.

Up to sixty-four processing elements (PEs) may be added to the illustrative system of which only three processing elements, 100, 105 and 110, are shown for clarity. Each PE is identical and contains a processor that is a conventional data processing device capable of executing both use application programs and supervisor programs which control and coordinate the operation of the associated processor. Each PE also contains a cache memory that operates on conventional principles to store both user and supervisor code and data and is used to reduce the effective memory access time. Also included in each PE is a read-only memory in which is stored additional frequently-used supervisor code and a bootstrap loading program which enables the processing element to become operational when it is reset or upon power-up. Although each processing element contains identical circuitry, each processing element is assigned a unique six-bit identification number which is determined by the electrical wiring of the connector slot into which the processing element module is inserted. The identification number is used to identify each processing element to its associated master interface for control transfer and bus access operations as will be hereinafter described.

The illustrative computer system also utilizes a virtual memory system in which the address information produced by the processors are translated before being provided to the external memory elements. A table of translations (a map) for translating virtual addresses into physical addresses which are used by the memory elements is stored in a random-access memory located in each processing element.

All processing elements are connected to redundant processor buses, such as buses 115–116, which are duplicated for reliability purposes and increased throughput. Access to buses 115 and 116 and the system buses 130 and 131 by the PEs is controlled by master interface units 120 and 125, respectively, which are duplicated for reliability and throughput purposes. Each master interface unit contains sequence and control logic and bus arbitration circuitry which can handle up to sixteen processing elements. In order to accommodate additional processing elements, additional processor bus and master interface unit pairs may be added to system buses 130 and 131. Up to a total of four processor bus pairs may be included to the illustrative system to accommodate sixty-four processing elements.

If there are more than 16 processing elements in a particular computer configuration, the processing elements are divided into groups of sixteen processing elements. Each group of 16 processing elements is connected to a common processor bus, which is, in turn, connected by dedicated master interface units to the system buses.

As will be hereinafter explained, in accordance with the invention, within each group of sixteen processing elements, supervisory control is shared among the processors. In particular, at any one time a supervisory or "executive" processing element is recognized by all the processing elements in one group and the executive role passes from processing element to processing element in a well-defined priority scheme. All system modules (including memory elements and peripheral units) are assigned uniquely to one processing element group, however, all processing elements can communicate with all memory elements and bus adapters, even those "belonging" to another group. In addition, some common areas in system memory are recognized by all processing element groups. Within each processing element group, system resources are allocated by the executive processing element as if that group where the only group in the computer system. Communication between groups is accomplished by means of the common memory areas.

Specifically, the executive processing element in one processing element group can request service from another processing element group by writing a request in a specified area of the common memory. The same memory location is subsequently read by the executive processing element serving the group from which service is requested. After the requested service has been performed, information is transferred in the reverse direction by a similar exchange of messages via the common memory area.

System buses 130 and 131 are connected to memory elements 165–175 and peripheral bus adapters 184–186 by means of slave interfaces 135, 140 and 145, 150, respectively. Each slave interface is identical and has a redundant duplicate for reliability purposes and to increase system throughput. More particularly, one slave interface in a pair can be used to provide an access path to one memory element or bus adaptor in the associated group while the other slave interface simultaneously provides an access path to a second memory element or bus adapter. Slave interfaces 135–150 contain circuitry which converts the signals produced by memory elements 165–175 and the peripheral buses 196–197 (via peripheral bus adapters 190–192) into signals which are compatible with the signals used on system buses 130 and 131.

In particular, slave interfaces 135 and 140 connect system buses 130 and 131 to memory buses 160 and 161. Although only two memory bus pairs, 160, 161 and 155,156, are shown for clarity, up to sixteen dual-redundant memory bus pairs may be added to the illustrative system.

Memory buses 160 and 161 are, in turn, connected to a plurality of memory elements and bus adapters of which three devices (memory elements 165, 170 and bus adapter 185) are shown. In the illustrative embodiment each of the memory elements contains $2^{21}$ bytes of random access memory and consists of a conventional random access memory unit. Other well-known memory units of different sizes may also be used in a well-known manner.

Slave interfaces 145 and 150 connect system buses 130 and 131 to memory buses 155 and 156 which are identical to buses 160 and 161. Peripheral buses 196 and 198 are coupled to buses 155 and 156 by interface circuitry consisting of bus adaptors of which two adaptors, 184 and 186, are shown and peripheral bus adapters of which units 190 and 192 are shown. Each bus adaptor contains buffer memories and data processing logic which can buffer and format data information received from the peripheral bus adapters and commands received from the processing elements via the system buses. In particular, each bus adaptor can handle signals on two independent command channels and two independent input/output data and command channels.

Each bus adaptor, such as adaptor 184, is connected to a peripheral bus adaptor 190 over a dedicated bus. The peripheral bus adapters contain a microprocessor and an associated program memory. Under control of a program stored in the program memory, the microprocessor unit can perform format conversions and buffering for information passing between the processing elements and the peripheral controllers and units. The formatting functions performed by the peripheral bus adaptor units help to speed up overall processing time by relieving the processing elements (PEs) of some routine data transfer tasks. Each peripheral bus adaptor can be individually programmed to provide an interface to a variety of standard peripheral buses onto which can be attached up to sixteen input/output controllers of various types. Peripheral bus adaptors 190-192 can be programmed to convert between the signals used on internal memory buses 155 and 156 and the signals used to the peripheral buses 196-198 and, therefore, allow many different peripheral bus formats to be used with the illustrative system.

In accordance with the invention, when a memory element or bus adaptor is inserted into the system, it undergoes an initial power-up clear and initialization cycle during which all of its bus drivers are turned off to prevent the unit from communicating erroneous information to the system. In addition, the unit's internal status registers are set to a predetermined state. After initialization has been completed the unit sends an interrupt to the current executive processing element thereby informing the executive processing element that it is available.

In response to this interrupt, the executive processor initializes the newly inserted unit by testing the unit to verify that its internal fault monitoring apparatus is operational and records its existence in appropriate memory tables.

If the unit is a memory element (determined by reading its status) it is assigned a physical name, thus defining the physical addresses to which it is to respond. Alternatively, if the unit is a bus adapter/peripheral bus adapter, a program is loaded into its internal program memory which program allows its internal microprocessor to query the associated peripheral devices in order to determine the number and type of peripheral units on the associated peripheral bus. Peripheral information is reported back to the executive processing element via the interrupt mechanism which thereupon responds by loading the appropriate operating programs into the program memory in the newly inserted unit and again updating system configuration tables in memory.

Figure 2:
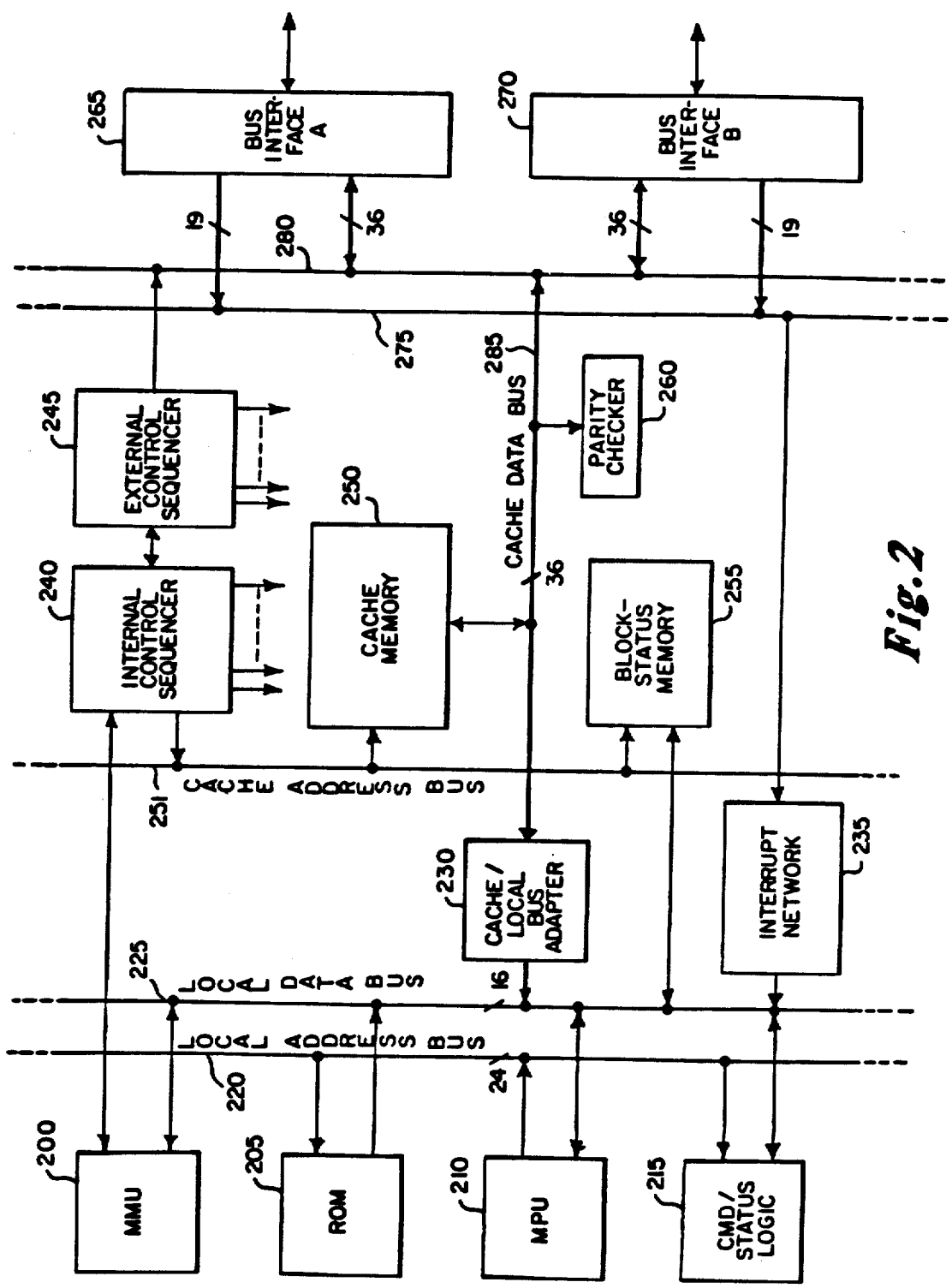
FIG. 2 shows a more detailed block schematic representation of the processing element shown on FIG. 1.

A more detailed functional block diagram of a processing element is shown in FIG. 2. Each processing element contains identical circuitry and therefore the circuitry in only one processing element will be discussed in detail to avoid unnecessary repetition. The heart of the processing element is a microprocessor unit (MPU) 210 which performs most of the ordinary calculations handled by the computer system. Microprocessor unit 210 may illustratively be a conventional 16-bit microprocessor. Several microprocessor units with suitable characteristics are available commerically; a unit suitable for use with the illustrative embodiment is a model MC68000 microprocessor available from the Motorola Semiconductor Products Company, Phoenix, Arizona.

Supporting the operation of MPU 210 are several other units which assist the MPU to decrease its processing time and decrease the effective memory access time. In particular, these units include memory management unit 200, ROM 205 and cache memory 250.

In particular, MPU 210 operates with a "virtual address" arrangement. In this well-known memory arrangement, MPU 210 produces "virtual" addresses which require a translation in order to convert them into the actual addresses which correspond to memory locations in the computer system main memory. The translation of virtual addresses to physical addresses is accomplished by memory management unit 200. Unit 200 is a well-known circuit which utilizes a translation "table" retrieved from main memory to perform the translation from virtual to physical addresses. Specifically, virtual address information produced by MPU 210 are provided to memory management unit 200 via local address bus 225. Memory management unit 200 translates the virtual address information into physical addresses used for addressing the main memory in the computer system. The translated information is provided to internal control sequencer 240 which controls the flow of information inside the processing element and gates the appropriate cache address onto cache address bus 251.

Cache memory 250 is a well-known memor element which is used to decrease the effective memory access time. In particular, a sub-set of the information stored in the main memory is also stored in cache memory 250. Memory 250 responds directly to virtual addresses supplied by microprocessor unit 210 and, if the requested information is present in the cache memory (called a "cache hit"), the information becomes available in a much shorter time interval than a normal access to main system memory would require. If the requested information is not present in the cache memory but is present in main memory, the attempted access is called a "cache miss" and well-known circuitry automatically transfers a parcel of information called a "block" containing the requested information from main memory into the cache memory. If the requested information is located only in peripheral secondary storage the access attempt results in a "page fault" which is handled via the master interface units as will be hereinafter described.

Cache memory 250 consists of a $2^{17}$ byte random access memory arranged in a 36 bit by 32,000 word (actually 32×1024 word) configuration (each 36-bit word contains 4 information bytes each associated with a parity bit). Information retrieved from cache memory 250 is provided, via cache data bus 285 and cache/local bus adapter 230 to local data bus 225 and thence to MPU 210. Cache/local bus adapter 230 provides interface and signal conversion circuitry between 32-information-bit cache bus 285 and 16information-bit local data bus 225. In addition, bus adapter 230 checks byte parity on data passing from cache memory 250 to local bus 225 and generates byte parity information for data flowing in the opposite direction.

Associated with cache memory 250 is block status memory 255. This memory contains a plurality of entries, each of which contains information regarding one block (128-byte segment) of cache memory 250. Each entry in block status memory 255 contains a "label" which identifies the virtual address, if any, currently mapped into the associated cache block (virtual address information is received from cache address bus 251). In addition, each entry in block status memory 255 contains a "valid" bit which indicates whether the contents of the associated block is valid in the present context (associated with the program presently running in MPU 210) and, each entry also contains a "dirty" bit which indicates whether the contents of the associated block, if valid, have been altered since the contents were initially loaded into the associated cache memory block. Block status memory 255 is also used for controlling the clearing of cache memory 250 during context switches and may be read by MPU 210 over local data bus 225.

Cache memory 250 may also receive information, via bus interfaces 265 and 270, from the 36 data lines 280 in the processor buses in order to update information in memory 250. More specifically, interfaces 265 and 270 connect the processing element to the processor buses and each accommodate 19 interrupt lines (including 15 information bits and 4 parity bits) and 36 address/data lines (which consist of 32 information bit lines and 4 parity bits). Miscellaneous control lines (not shown) also pass through interfaces 265 and 270 to control the operation of the processing element.

The byte parity of information passing from data bus 280, via cache data bus 285, to cache memory 250 is checked by parity checker 260 which consists of well-known parity checking circuitry that provides error detection for information transferred from the computer system main memory to cache memory 250.

Data transfers which occur between the processing element and the processor bus via interfaces 265 and 270 are controlled by the external control sequencer 245. Sequencer 245 receives synchronization signals from internal control sequencer 240 and controls data transfers by gating the appropriate addresses onto bus 280, generating control signals and coordinating the transfer of data between cache memory 250 and the processor bus.

Read-only memory 205 is also connected to the local address and data buses 220 and 225, respectively, and contains program instructions that can be accessed by MPU 210. In particular, ROM 205 contains a "bootstrap" program which is used to restart the processing element after initial system power-on or after a system reset. In order to increase the processing speed of MPU 210, ROM 205 also contains other frequently-used operating system routines which may be accessed by MPU 210 over local data bus 225.

In addition to receiving data signals via bus 280, interfaces 265 and 270 may also receive interrupt signals over 19-bit interrupt bus 275. Incoming interrupt signals are provided to interrupt network 235 which gates the interrupt data received over interrupt bus 275 onto local data bus 225 where the data can be read by MPU 210. Interrupt data received over interrupt bus 275 consists of an 8-bit identification code indicating the source of the interrupt, a 3-bit level code indicating the level of the interrupt and a 4-bit interrupt vector which indicates the memory location at which the desired interrupt routine begins. In addition, 4 parity bits are included to detect errors in the remaining 15 information bits on the 19-bit interrupt bus.

In a multi-processor computer system, it is necessary, as previously described, for there to be a common control "executive" which handles tasks which are common to all processors and which allocates system resources. For example, the "executive" processor may perform tasks such as scheduling user tasks handling interrupts and allocating global resources such as input-/output channels and peripheral devices between the programs running in the processing elements. In addition, as new user tasks are input to the system the executive processor allocates memory space to each task so that when that task is processed by a processing element, the processing element's internal translation table can be loaded with the appropriate memory information. Advantageously, in accordance with the invention, in the illustrative embodiment, the executive tasks are handled by each of processing elements 100–110 (FIG. 1) on a rotating basis. The processing units coordinate the transfer of the executive function by means of special executive control circuitry located in master interfaces 120 and 125.

More specifically, each processing element is temporarily assigned the executive processor role according to a predetermined routine. In accordance with this routine, a processing element, upon being initially turned-on, first exercises a self-diagnostic program to determine whether it is operating satisfactorily. This routine is controlled by a program stored in the read-only memory associated with each processing element.

After successfully completing the self-diagnostic routine, the processing element reads a predetermined location (the executive control word register) in its associated master interface to determine whether there is a current executive processor and, if so, the identification number of the executive processor.

If the information read from the executive control register indicates that another processor has already been designated executive, the processing element which has just come "on-line" generates an "executive processor request" signal that indicates to the current executive processing element that the new processing element is requesting a transfer of the executive functions. The executive processor request is registered in the executive control word of the processing element's associated master interface. The processing element then waits until its request is granted, as will be hereinafter described.

Alternatively, if at the time the processing element goes on-line, no other processor has been assigned the executive role, the processing element attempts to designate itself the executive by writing its own identification number into the executive control word register. If this write operation is successful, the processing element becomes the current executive processor.

Upon becoming an executive, a processing element undertakes the common system tasks. For example, it may perform system diagnostics, log errors and faults, perform resource reallocation, service any processor interrupts that are pending, maintain system queues and perform other global tasks. In addition the executive processor runs a scheduling routine which places user tasks waiting to be executed in a priority list. All processing elements select the user task with the highest priority from this list when they have finished executing a task. After performing all outstanding system tasks, the executive processor examines the list of user tasks waiting to be executed, selects the user task with highest priority and begins execution of the selected task. The executive processing element then prepares to transfer the executive function to another processing element, either a processing element that is requesting transfer of executive control, if any such requests are outstanding, or to the processing element (possibly itself) running the lowest priority user task.

Executive processor requests can also be generated by processing elements which have finished their assigned user task or which are in the process of running a user task that requires a temporary suspension for some reason (for example, when a user task makes a request to its supervisor program in the associated processing element, the supervisor program determines whether the request can be granted immediately or whether there will be a delay. If a delay will occur then the task running is stopped and a new task is started—a context switch. If a context switch is required, the supervisor program takes the appropriate action culminating with a request to become executive processor).

If two or more processing elements request to become executive processor, the executive role is assigned in a predetermined priority scheme.

Additional monitoring techniques are used in the illustrative system to insure that the system does not operate for any significant period of time without an executive processing element. Specifically, all PEs monitor the time that an interrupt remains pending. If the pending time exceeds a predetermined interval, then a diagnostic routine is initiated to determine the cause of the delay. Also when a PE requests to become executive processing element it monitors the elapsed time that its request has been pending and if this time exceeds a predetermined interval a failure is indicated. Further when the current executive processor passes off the executive role to another processing element, it verifies that an interrupt has been generated by the master interface unit to cause executive control to be transferred.

If a PE determines that the current executive processing element has failed, it attempts to designate itself as executive processing element and the first PE to succeed in doing this becomes the new executive processing element. The new executive processing element then completes any task left over by the faileomes the new executive processing element. The new executive processing element then completes any task left over by the failed executive processing element, updates system and global fault-status tables and configuration tables and resumes normal executive processing.

Figure 3:
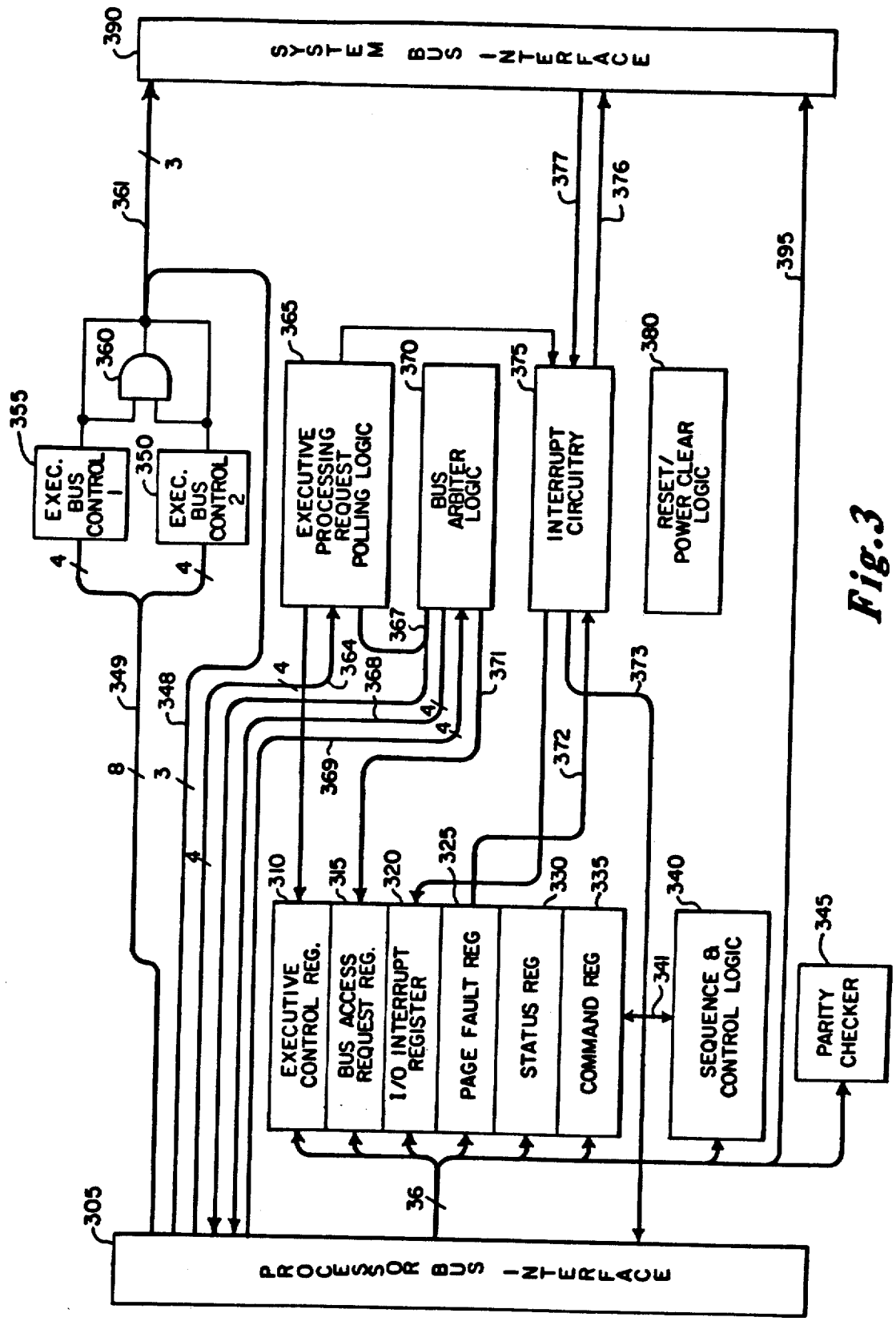
FIG. 3 shows a more detailed block schematic representation of the master interface unit shown on FIG. 1.

Circuitry associated with executive control and request processing is located in each master interface unit and is shown in FIG. 3 in block schematic form for one master interface unit. The circuitry for the remaining units is identical and omitted for clarity The master interface circuitry connects to one of the processor buses via processor bus interface circuitry 305.

Interface circuitry 305 consists of well-known driver and receiver circuits and associated timer circuitry for sending and receiving signals over the processor buses to and from the processing elements. System bus interface 390 contains similar circuitry and allows signals to be sent to each master interface unit from the system buses. Interfaces 305 and 390 are connected together by bus 395 which allows transfer of information between the processor buses and the system buses during system operation. More particularly, when information is to be passed from the processor bus to the system bus, the master interface unit takes information received through interface 305 and drives the information to the system bus through interface 390. Similarly, when information is to be passed from the system bus to the processor bus the master interface unit takes information received from the system bus through interface 390 and drives the information to the processor bus through interface 305.

Each master interface circuit also contains a set of storage elements called a "register file" which consists of six registers, 310–335. Under control of sequence and control logic 340, these registers store information which is used in coordinating the operation of the processing elements and the transfer of the executive control function. Information stored in these registers is also used by the master interface circuitry to process bus access requests and interrupts generated by the processing elements and the peripheral units and to service "page faults" which occur during the virtual memory translation process as will be hereinafter described.

The remaining circuitry in the master interface includes executive processing request polling logic 365, bus arbitrator logic 370, interrupt circuitry 375, reset logic 380 and executive bus controls 350 and 355. Executive processing request polling logic 365 cooperates with the executive control register to coordinate the passing of the executive control from processing element to processing element. Bus arbitrator logic 370 is used, as will hereinafter be explained, to select one of several processing elements requesting access to the processor bus for service. Interrupt circuitry 375 processes interrupt generated by either the processing elements or the memory or peripheral elements and passes the interrupt information along to the appropriate processing element.

When a master interface unit is initially powered-up, reset/power clear logic 380 resets all of the master interface circuitry. For clarity, although no connections are shown between logic 380 and remaining circuitry, logic 380 is connected to all circuits in the master interface.

Since there are two master interface units associated with each processing element group, one master interface unit must be chosen as the "executive" master interface which stores the identity of the executive processor (the associated processor bus is also designated as the executive bus). The coordination of the executive roles between master interface units is controlled by the executive control circuits. In particular, when the computer system is initially turned-on, or upon a system reset for any purpose, one of the redundant master interfaces must be chosen as the executive interface to begin registering the identity of the executive processor; both interface units process requests to access the processor and system buses, but the non-executive master interface unit operates as a standby unit in connection with the coordination of executive processor roles. In the illustrative embodiment this selection occurs in accordance with a predetermined program.

More specifically, when an interface unit is initially powered-up, power clear logic 380 clears its internal status registers. Each master interface waits for a predetermined, fixed time interval following power clear and then declares itself as the executive master interface unless the other redundant master interface has already declared itself as executive. The predetermined time delay is determined by dividing down a clock signal produced by sequence and control logic 340. The amount by which the clock is divided down is determined by the physical location of the master interface module in the computer cabinet. Thus, if both master interface units of a redundant pair are turned on at the same time, one of the units, if it is functional, will always declare itself the executive unit before the second.

In order to decide which interface is the executive and which is standby, each master interface circuit includes two executive bus controls, 350 and 355 that are used to determine which of the dual-redundant master interfaces acts as the executive interface.

Specifically, the selection between master interfaces is carried out by the executive bus controls 350 and 355. The controls are duplicated in order to ensure reliability in case one processor bus becomes damaged. Each of controls 350 and 355 generates an output signal indicating its determination of its associated master interface's status. A "high" signal at the output of a control indicates that the control has determined that its master interface is the executive; a "low" signals is indicative of standby status. Each of the output signals generated by controller 350 and 355 is applied to inputs of AND gate 360 and the three signals, consisting of the outputs of each of circuits 350 and 355 and the output of AND gate 360 are sent from each master interface to the other computer modules, including the processing elements and the other master interface.

A master interface is accepted as the executive master interface if at least two of the three status signals indicate that the associated master interface is the executive interface. In particular, each of control circuits 350 and 355 receives four inputs. The four inputs consist of the three output signals produced by the bus controllers in the alternative master interface plus a processor bus switch-over request generated by the processing elements when the current "executive" bus is determined to be defective. Each of the control circuits 350 and 355 in each master interfaces monitors the status signals generated by the alternative master interface. If the latter declares itself to be the executive interface, the monitors place "low" signals on their outputs thereby causing the associated master interface to relinquish the executive role. This operation ensures that only one master interface assumes the executive role at any given time and that no single failure can cause a defective master interface to declare itself executive erroneously.

During operation of the system, the PEs monitor the time needed to gain access to the processor buses, the time needed to get a response from whatever device are accessed and the parity information associated with the control and data information passing through the processor buses. If predetermined time limits are exceeded or a parity violation occurs, a fault condition is indicated. The fault condition causes the PE which detected it to enter a diagnostic routine to determine the cause of the fault and whether the fault is permanent or transient. If the fault is transient it is logged and operation continues. If the fault is permanent and in the non-executive bus the PE sets a status bit to force all subsequent bus accesses to use the executive bus exclusively. If the fault is in the executive bus, the PE stores an appropriate status word in an status register located in main memory to indicate this fact. The PE then reads the status blocks of other PEs to determine if other PEs have recognized the current "executive" bus as faulty. If the PE finds corroboration (or if it is the only operating PE in the system or cannot reach main memory over either processor bus) it requests the non-executive master interface to assert executive control. As will hereinafter be described in detail, a proper request from a processing element will cause the non-executive master interface to assert control which, in turn, causes the executive master interface to relinquish control.

The operation of the register file and its role in the transfer of the executive function and the coordination of the processing elements, memory elements and peripheral elements will now be described. The register file consists of registers 310-335. Each of these registers consists of a well-known temporary storage element which is capable of storing the required number of bits simultaneously. The register file receives a 36-bit input from the processor bus interface 305. The 36-bit input signals are also applied to parity checker circuit 345 which is a well-known circuit that detects errors that may have appeared during transmission of the signals over the processor bus. The registers receive and store information under control of the sequence logic 340, polling logic 365, bus arbitrator logic 370 and interrupt circuitry 375.

In particular, executive control functions are coordinated by means of the executive control word register 310. This register is used to indicate pending requests to the executive processor and to denote the current executive processor's identification number. The current executive passes the executive function onto another processing element by storing the identification number of the designated processing element in this register along with a code denoting an interrupt level which notifies the new executive that an executive transfer is about to occur.

More specifically, executive control functions are passed between processing elements under control of a series of interrupt signals. In the illustrative embodiment, there are seven types, or levels, of interrupts recognized by the processing elements. Interrupt levels 1 through 3 are used by the slave interfaces to request interrupt services for peripheral units from the processing elements. Level 4 interrupts are used in connection with the servicing of page faults, as will be described in further detail below. Level 5 and level 6 interrupts are used for the transfer of executive control and level 7 interrupts are used internally by the processing elements for fault or status determination conditions.

Specifically, when the present executive processing element identifies a new executive processor, it stores the identity of the new executive in the executive control word register and if the new executive processor is not generating an executive processor request, it causes the master interface circuit to generate a level six interrupt signal. This level causes all processing elements to respond and read the identification number of the new executive processor. If the new executive processor is generating an executive processor request, a level 5 interrupt is generated. During normal processing operations the processing elements only respond to level 6 and 7 interrupts, but before a processing element makes a request to become executive processor it lowers its priority level so that it can respond to level 5 interrupts. All interrupts generated by a master interface are removed when the interrupted device responds and reads the executive control word.

The actual arrangement of the information in the executive control word register is shown in FIGS. 4A and 4B. The register is 36 bits long of which bits 0-31 are used to store information and bits 32-35 are used to store a parity code for error checking purposes in accordance with well-known error checking principles. FIG. 4A shows the configuration of the data portions of the executive control word register when the register is being written by the executive processing element. Bits 4-7 contain the 4-bit processor identification code identifying the new executive processor.

Bit 8 is a level bit indicating the interrupt level which will be generated by the master interface interrupt circuitry. Under normal operation, the interrupt level would be a level 5 or level 6 (as previously described, a level 5 interrupt is used to alert a processing element of an impending executive change if that element has already requested to become executive and a level 6 interrupt is used to alert a non-requesting processing element of a change in executive function to that processor). The remaining bits contain information accessed when the executive control word is read by the processing elements.

FIG. 4B shows the arrangement of information in the executive control word register as it appears when being read by the processing elements. Bits 0-3, 12-19, and 28-31 are used to temporarily store requests generated by the processing elements to become an executive processor. Each bit is uniquely associated with one processing element. If the bit is a "one" it indicates that the associated processing element is requesting to be an executive processor. Alternatively, if the bit is "zero" it indicates that the associated processor is not requesting to be an executive. Bits 4-7 are used to store a four-bit binary code indicating the executive processor's identification number.

Bit 8 indicates the interrupt level as with the write configuration (that is, level 5 or level 6) The executive control register also contains an additional bit (9) which is used to indicate whether a valid executive exists in the system or not. This bit is checked by a processing unit after power-up or reset to determine whether a valid executive already exists.

The next two registers, the bus access request register 315 and the I/O interrupt register 320 are actually separate parts of one register. The bus access request register contains one bit associated with each processing element, which bit identifies whether or not the associated processing element is currently requesting access to the processor bus. The information in this register can be used by bus arbiter logic 370 for bus access allocation (as will be hereinafter described) or the information can be read for performance monitoring purposes by the processing elements.

Input/output interrupt register 320 contains information regarding the identity of the bus adapter or memory element currently generating the highest level interrupt. In particular, as shown in FIG. 4C, eight bits (bits 5, 6, 9, 10, 21, 22, 25 and 26) are used to store an interrupt requesting device identification number which uniquely identifies the memory element or peripheral unit requesting interrupt services. Bits 4, 8, 20 and 24 are used to store an interrupt vector which indicates the address to which the program of the processing element is to proceed when the interrupt is serviced. Two bits (bits 7 and 11) indicate the interrupt code which indicates the interrupt level generated by a requesting memory element or bus adapter (normally these devices generate interrupts at levels 1, 2 or 3).

Referring to FIG. 3, interrupt request register 320 is written and read by interrupt circuitry 375. Interrupt circuitry 375 generates polling signals which are used to interrogate the slave interfaces for pending interrupts generated by the memory elements and bus adapters. Circuitry 375 also receives signals from the slave interfaces indicating the identity of bus adapters or memory elements currently requesting interrupt services. From these inputs interrupt circuitry 375 determines the identity of the element requesting the highest level interrupt. This identity information is stored by interrupt circuitry 375 in the appropriate location in register 320 along with the associated interrupt level and vector. In addition, interrupt circuitry 375 also relays interrupt information to the processing elements via bus 373 and processor bus interface 305.

An additional function performed by circuitry 375 also is the servicing of "page fault" interrupts in coordination with page fault register 325. In particular, a processing element in attempting, as previously described, to perform a virtual memory translation using translation tables stored internally, may determine that the desired translation information is not stored in its internal memory. In this situation a "page fault" occurs and the processing element may request assistance from the executive processing element in order to fetch the necessary information from another location—usually a secondary storage element such as a disk located on a peripheral bus. To request assistance, the processing element experiencing a page fault stores its identification number in register 325 along with a bit indicating that a page fault service request is being made. In addition, the virtual address of the faulted page is also provided. In particular, when a page fault request is made, as shown in FIG. 4D, the first four bits of this register comprise the identification number of the processor which has experienced a page fault. Bit 4 is a status bit indicating that a request is pending or has been completed. The virtual page number of the faulted page is contained in data bits comprising bits 7-23.

When information is written into page fault register 325, its status is conveyed to interrupt circuitry 375, via leads 372, which thereupon issues an interrupt to the processing elements. The executive processor responds to this interrupt by reading the information stored in page fault register 325 and fetching the required translation information from its secondary location in accordance with well-known virtual memory operations. After the missing page has been brought into main memory, the executive processor stores the physical address of this information in register 325, via processor interface 305. More specifically, information stored in register 325, as shown in FIG. 4E, includes the identification of the processing element requesting page fault services (bits 0-3), a service complete bit (bit 4) and the physical address of the desired page (bits 12-31). The presence of the new information in register 325 causes interrupt circuitry 375 to again issue an interrupt to which the page-faulted processing element responds.

Two other additional registers, the status register 330 and the command register 335 are included in the register file located in the master interface. Status register 330 contains status bits which indicate various fault conditions. Command register 335 contains information which is used to set up selected diagnostic tests. The operation of these two registers is not important for the present invention and they will not be discussed further.

Bus arbiter logic 370 controls access by the processing elements to the processor bus. In particular, access by each processing element to its processor bus is controlled by the associated master interface. Bus arbiter logic 370 grants access to the processor bus in a sequential manner, as will hereinafter be described in detail.

Since the illustrative modular computer system can grow to complex configurations, if every module were allowed to access the system buses directly the necessary bus arbitration scheme would become cumbersome and inefficient. Therefore, only processing elements assume control of the processor and system buses even in the case of a direct memory transfer from secondary storage to main memory (DMA transfers). When a processing element is granted access to a bus it monitors the bus control lines to determine when the bus actually becomes available. As soon as the bus becomes available the PE sends the address of the bus adapter or memory element to which it requests access over the bus and a code indicating the amount of data to be transferred. On non-DMA transfers the processing element then waits for the addressed element or unit to generate an acknowledge signal. When it receives the acknowledgement signal, it transfers a block of data whose length was previously specified. Alternatively, on DMA transfers, after sending a first address, the processing element waits for the acknowledge signal and then sends a second address and data length information to a second element or unit. The first address identifies the data destination and the second address identifies the data source. Once both addresses have been acknowledged, data transfer continues directly between the elements or units. Advantageously, if a DMA transfer occurs between a memory element and peripheral unit located on the same memory bus, the processor bus and system bus become available for use by other processing element as soon as the second DMA address has been acknowledged, thus significantly increasing bus capacity. In addition, control of information transfers by the processing elements allows certain transfers to take place which are normally not possible. For example, a DMA data transfer may take place between a peripheral unit (via a bus adapter) and two memory elements simultaneously (in this case three addresses, two destination and one source, are sent by the processing element) or between two memory elements directly. The former transfer arrangement is useful in fault-tolerant computers to provide backup capability and the latter transfer operation is useful both in fault-tolerant computers and shared data systems to provide a second copy of data.

Figure 5:
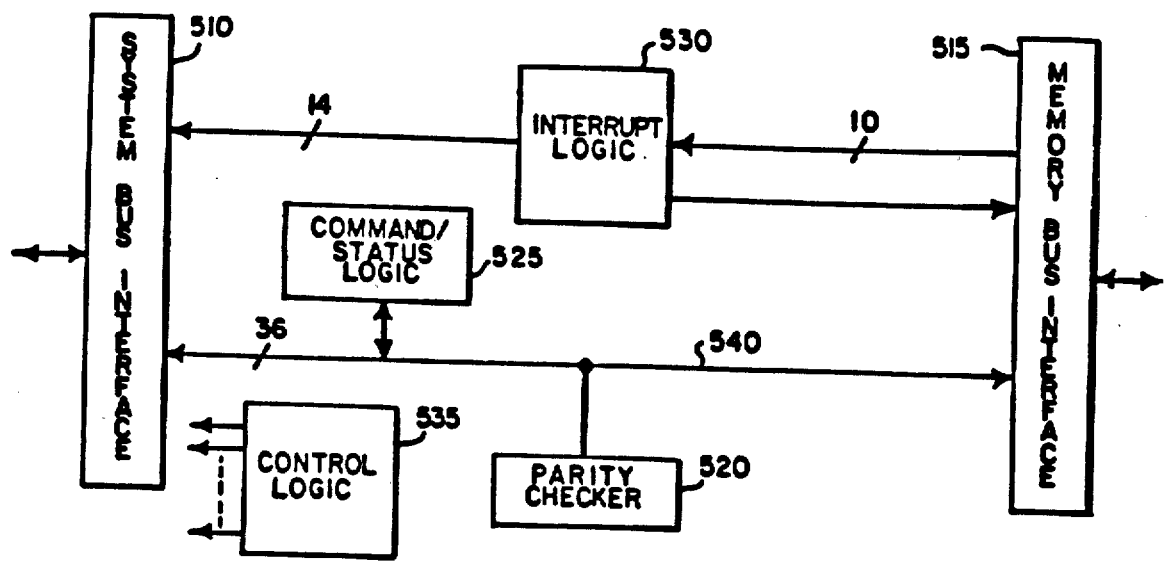
FIG. 5 shows a more detailed block schematic diagram of the slave interface unit shown in FIG. 1.

FIG. 5 shows a functional block diagram of the slave interface unit of the illustrative modular computer system. The slave unit is connected to the system bus by bus interface 510 and to the associated memory bus by bus interface 515. System bus interface 510 provides filtering and buffering for 36 address/data lines and associated control lines and 14 interrupt lines.

Similarly, memory bus interface 515 provides filtering and buffering for 10 interrupt lines (consisting of 2 interrupt level bits, 4 interrupt source identification code bits and 4 parity bits) and 36 address/data lines (32 information bits and 4 byte parity bits) and some associated control lines for transferring information from the slave interface to the memory bus and ultimately to the memory elements or bus adapter units. Information on 36-bit internal data bus 540 is provided to a parity circuit checker 520 which checks byte parity on received addresses and data. Information is also provided command/status logic 525 which decodes incoming information and recognizes selected commands that are used for diagnostic purposes and stores status conditions of the associated memory elements or bus adapter units that are used to indicate failure conditions to the processing elements.

The 10 interrupt lines which pass through memory bus interface 515 and the 14 interrupt lines which pass through system bus interface 510 are provided to interrupt logic 530. Interrupt logic 530 contains well-known circuitry which generates a "polling" sequence that is used to determine if any of the associated memory elements or bus adapters are generating an interrupt signal to request service. In particular, each memory element or bus adapter is "polled" or examined in a predetermined sequence to detect an interrupt. The slave interfaces are, in turn "polled" by interrupt circuitry (to be described in detail below) in the master interface. Any interrupts detected by the slave interfaces is relayed to the master interface units over the system bus via bus interface 510 in response to a polling signal received from a master interface.

The operation of the entire slave interface is controlled and synchronized by control logic 535 which contains well-known clocking and sequence generating circuitry to provide synchronization signals to the remaining circuitry in the unit.

Figure 6:
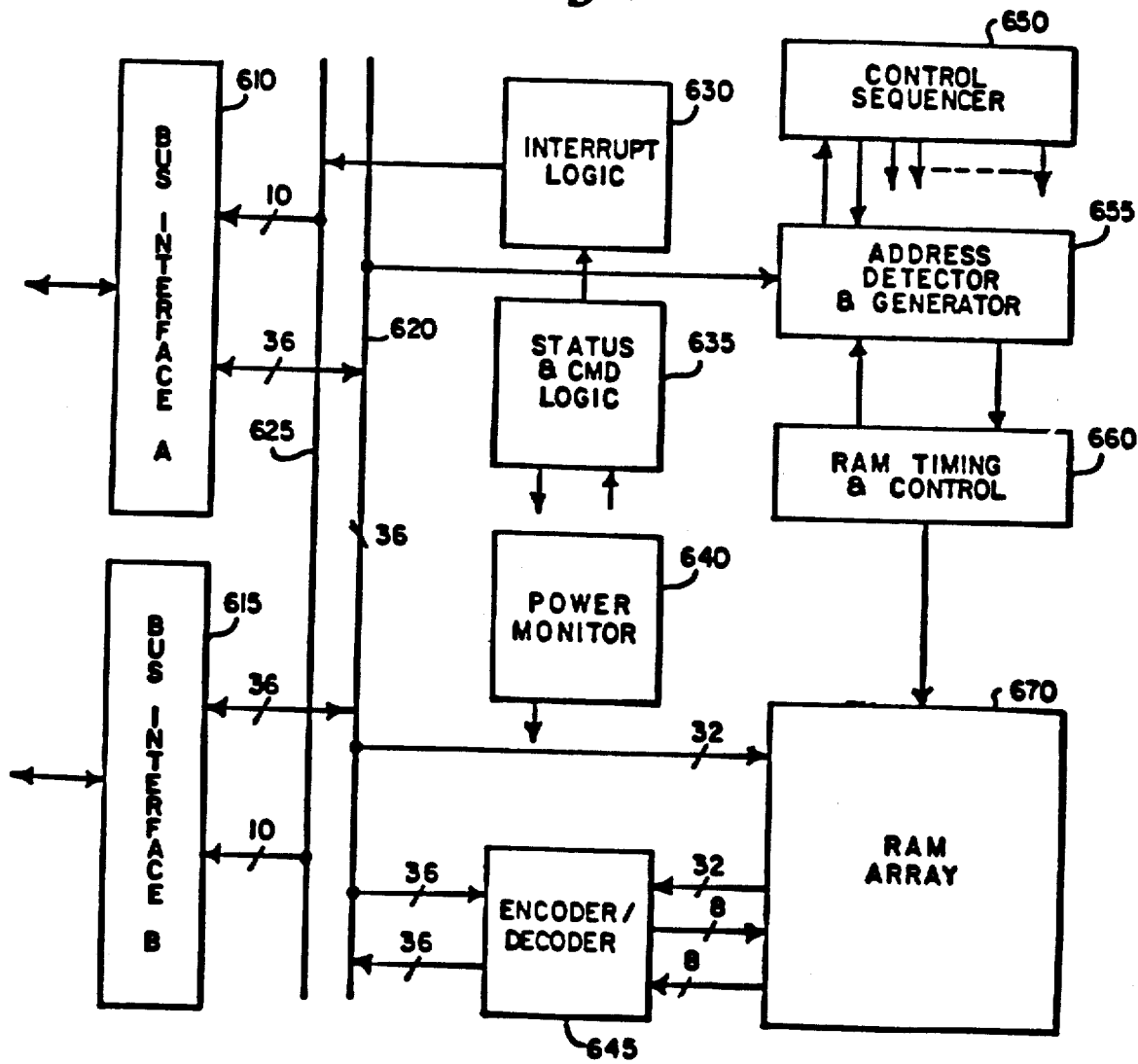
FIG. 6 shows a more detailed block schematic diagram of the memory element shown in FIG. 1.

A more detailed functional block diagram of a memory element is shown in FIG. 6. All memory elements contain identical circuitry and only one will be discussed in detail for clarity. Each memory element is connected to both redundant memory buses by means of interfaces 610 and 615. Each interface circuit contains circuitry which filters and buffers 10 interrupt lines (6 information bits and 4 parity bits), 36 address/data lines (32 information bits and 4 byte parity bits) and several associated control lines.

Incoming address information is passed by interfaces 610 and 615 to internal address bus 620 where the information is provided to address detector and generator circuit 655. Circuit 655 decodes and detects addresses to which the associated memory element is programmed to respond. In addition, in accordance with well-known principles, it generates a sequence of address information which is needed to access a block (128 bytes) of data stored in random access memory (RAM) array 670. The information produced by circuit 655 is provided to RAM timing and control circuit 660. This circuit also contains well-known circuitry which generates the timing signals (row and column address strobes) and the control signals (chip selects) which are used to control RAM array 670. In addition, RAM timing circuit 660 contains circuitry to drive the address leads (the row and column addresses) needed to access information in RAM array 670 and to provide periodic "refresh" signals in order to prevent information loss in array 670.

RAM array 670 contains 320 64K dynamic random access memory devices. These devices are conventional, commercially-available memory devices available from a number of semiconductor manufacturers. Array 670 is organized into an 8 row by 40 column array ($2^{19}$ 32-bit word, 8 parity-bit rows). In response to timing control signals produced by circuit 660 and address signals provided via internal address bus 620, RAM array 670 provides stored information and associated stored parity check bits to encoder/decoder 645. Circuit 645 accepts the 40-bit encoded information retreived from RAM array 670 and uses the 8-bit parity information code to identify and correct any single bit error in accordance with well-known error correction techniques. Also, in accordance with well-known error detection techniques the 8-bit error correcting code is used to detect all double and most multiple bit errors. Status flags are set by circuit 645 to indicate that an error has occurred. Encoder/decoder circuit 645 is also used to generate byte parity bits which are sent along with all retrieved information that is either correct or has been corrected by the error correction circuitry. The 32-bit information word retrieved from RAM array 670 is provided, along with 4 parity bits, to the 36-bit internal data bus 620 and, via interfaces 610 and 615, to the memory bus and to the other units in the computer system.

Several additional circuits are used to service the memory circuitry including interrupt logic 630, status and command logic 635, power monitor circuit 640 and control sequencer 650. Control sequencer 640 generates control and synchronzation signals which are used to sequence the memory element through its various operations. These sequence signals are generated in a standard fashion.

Power monitor circuit 640 monitors the system power supply and generates a "clear" or reset signal when power is first applied to the memory element. In addition, power monitor circuit 640 also detects a condition in which only stand-by power is available so that the memory element can go into a refresh-only mode thereby reducing power consumption yet maintaining the stored information intact.

Status and command logic 635 stores status information (for example, fault conditions and the address being accessed at the time of a fault, etc.) for external access by the processing elements during a fault condition. Circuit 635 also accepts commands from the processing elements, which commands are used to set up diagnostic tests and other diagnostic functions.

Interrupt logic 630 initiates interrupts to the master interface in the event of a fault in the memory element and on initial power up of the memory element to indicate that the memory unit is functioning and available.

Figure 7:
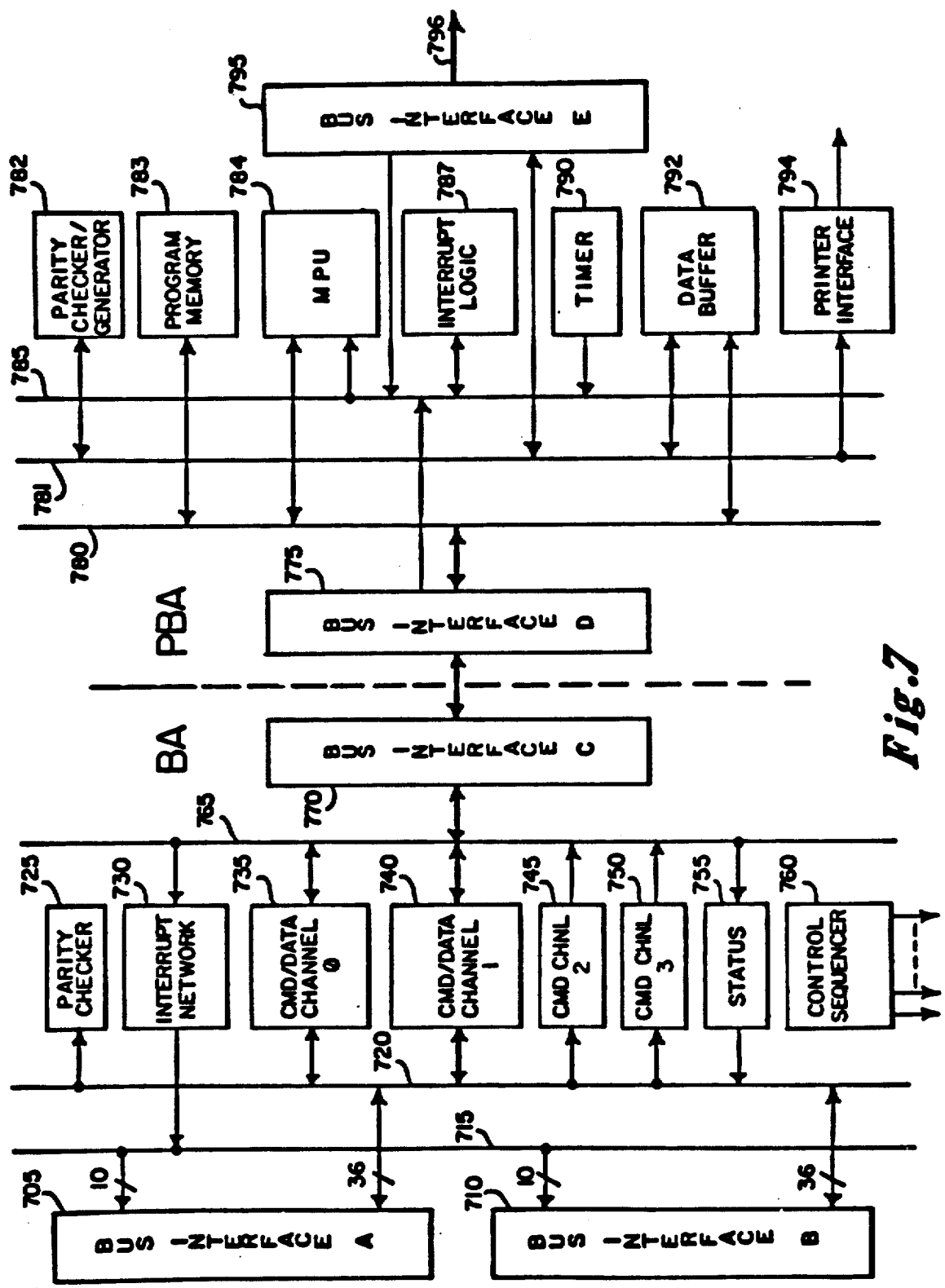
FIG. 7 shows a more detailed block schematic diagram of the bus adapter/peripheral bus adapter unit shown in FIG. 1.

FIG. 7 shows a functional block diagram of the bus adapter/peripheral bus adapter units which are used to connect peripheral devices to the illustrative computer system. In particular, the bus adapter unit is connected to the redundant memory buses by means of bus interfaces 705 and 710. Each interface provides filtering and buffering for 10 interrupt lines (6 information bits and 4 parity bits); 36 address/data lines (32 information bits and 4 byte-parity bits) and some associated control lines. Information on the 36 address/data lines passes through interfaces 705 and 710 and is placed on internal address-/data bus 720. Likewise, information generated by interrupt network circuitry 730 is placed on internal interrupt bus 715 and passes through interfaces 705 and 710 to the memory buses.

Interrupt network 730 contains well-known circuitry which generates and relays interrupt information indicating fault conditions, initial power-up status, the completion of input/output operations and other conditions to the interrupt bus.

Data information passing from the peripheral units to the memory buses and command and address information passing from the memory buses to the peripheral units and the peripheral bus interface (PBA) passes, via internal data bus 720, to command/data channels 735-750. Command/data channels 735 and 740 accept command information generated by the processing elements (which information defines, for example, input-/output operations to be performed by the peripheral units) and store the command information for access by microprocessor 784 located in the peripheral bus adapter. In addition, each of command/data channels 735 and 740 buffers up to 2 kilobytes of input/output data generated by the peripheral devices or passing to the peripheral devices.

Two additional command channels, 745 and 750, are also provided which can accept and store command information, but do not have data buffering capability.

Information on internal data bus 720 is checked by parity checking circuit 725 which checks byte-parity on the information received from the memory bus and flags any detected errors.

Also included in the bus adapter circuitry is a status register 755 which stores status information, such as fault conditions and the status of the peripheral units, for access by the processing elements. A control sequencer 760 consists of well-known circuitry which generates the sequences of control signals needed to perform the various bus adapter operations.

Command and data information passing through command/data channels 735-750 is provided to local data bus 765 and from there to bus interface 770. Bus interface 770 and its companion bus interface 775 (located in the peripheral bus adapter) provide conversion and buffering for data and command signals passing between the bus adapter and the peripheral bus adapter circuit via a 16-bit wide bus which interconnect the two units.

A peripheral bus adapter unit (PBA) performs conversions in the data and command information which is received by the bus adapter unit to place the information in proper format for utilization by the peripheral units connected on the peripheral buses. In particular, data and command information passing through interface 775 are provided to the incoming PBA data bus 780.

Connected to bus 780 is a microprocessor unit (MPU) 784 which is used to control the operation of the peripheral bus adapter and to coordinate, manage and format information passing between the bus adapter and the peripheral devices. A suitable microprocessor unit for use with the illustrative embodiment may be a model 8085 manufactured by the Intel Corporation and programmed according to standard programming instructions provided with that unit.

Information on incoming data bus 780 is also provided to data buffer 792 which provides a temporary storage for data received from, or to be transmitted to, the bus adapter. After temporary storage in data buffer 792, the information may be transferred to outgoing data bus 781 for transmittal to bus interface 795 where it is buffered and filtered and applied to peripheral bus 796.

The information on the outgoing bus 781 is checked for transmission errors by parity checker/generator circuit 782. More specifically, this circuit checks parity bits on data received from the two bus interfaces 775 and 795 and generates parity on data transfers between these interfaces.

Also included in the peripheral bus adapter circuitry is an interrupt logic circuit, 787, which, under control of timer circuit 790, generates interrupts at programmable intervals which interrupt information is provided to MPU 784 over interrupt bus 785. Interrupt circuit 787 also translate interrupts received from the peripheral bus (via interface 795 and bus 785) and from the bus adapter (via bus adapter interface 775 and interrupt bus 785) into interrupt signals which are used to interrupt and control the operation of MPU 784.

A special printer interface 794 is also connected to the outgoing data bus 781 to provide special synchronization, formatting and control signals for transferring information on outgoing bus 781 to a line printer.

Figure 11:
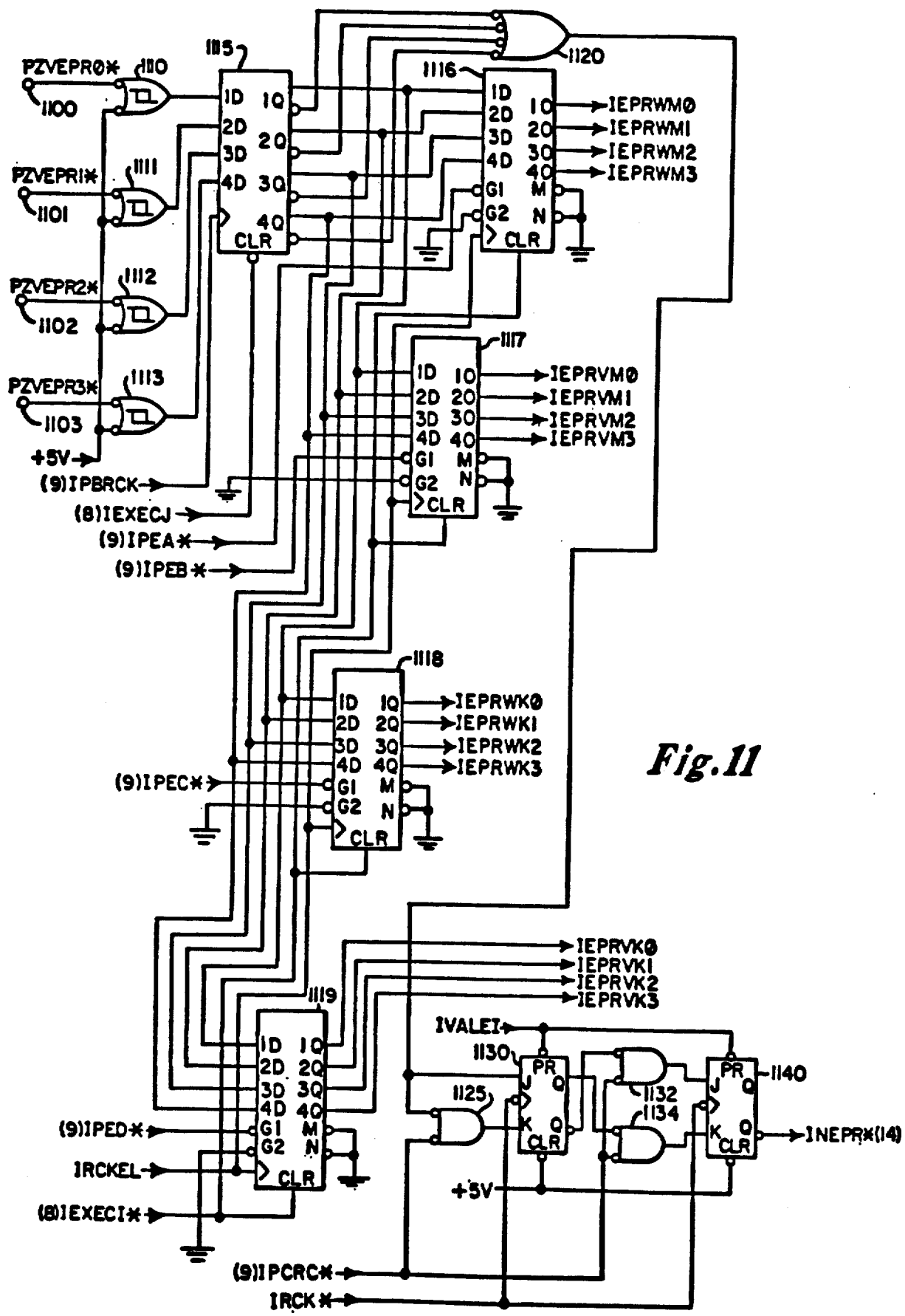
FIG. 11 is a detailed shematic circuit diagram of the executive processor request register for a master interface unit.
Figure 12:
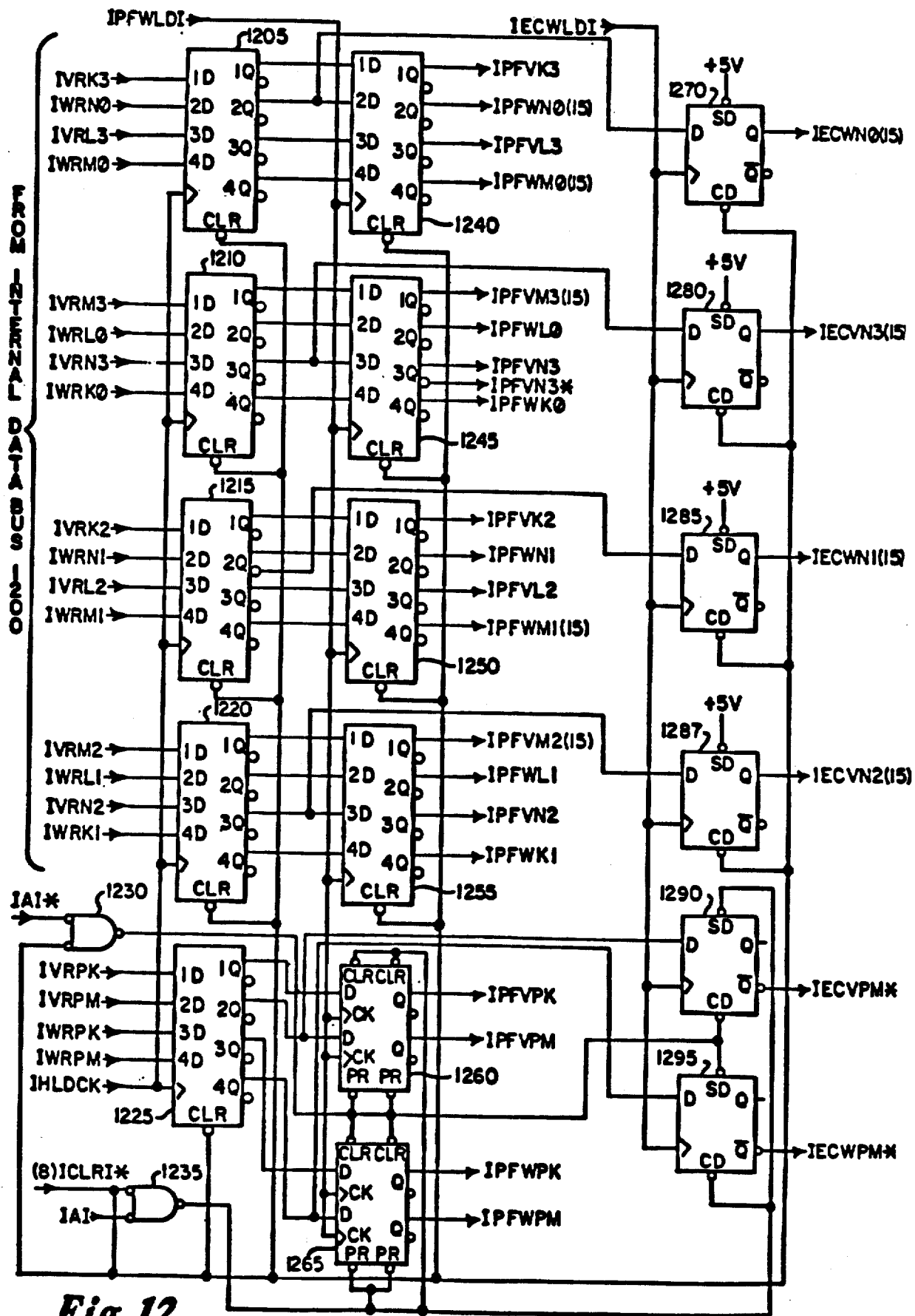
FIG. 12 is a detailed shematic circuit diagram of the holding, page fault word and executive control word registers for a master interface unit.
Figure 13:
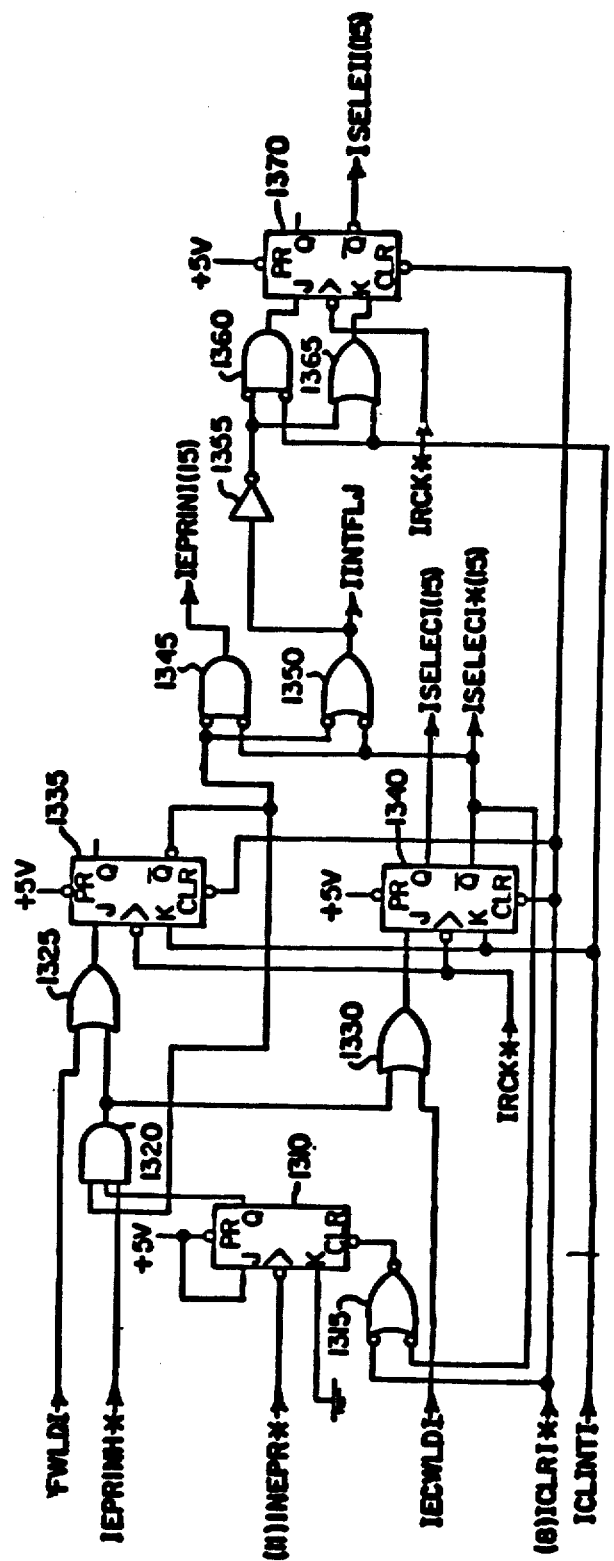
FIG. 13 is a detailed shematic circuit diagram of the interrupt network control circuitry for a master interface unit.
Figure 14:
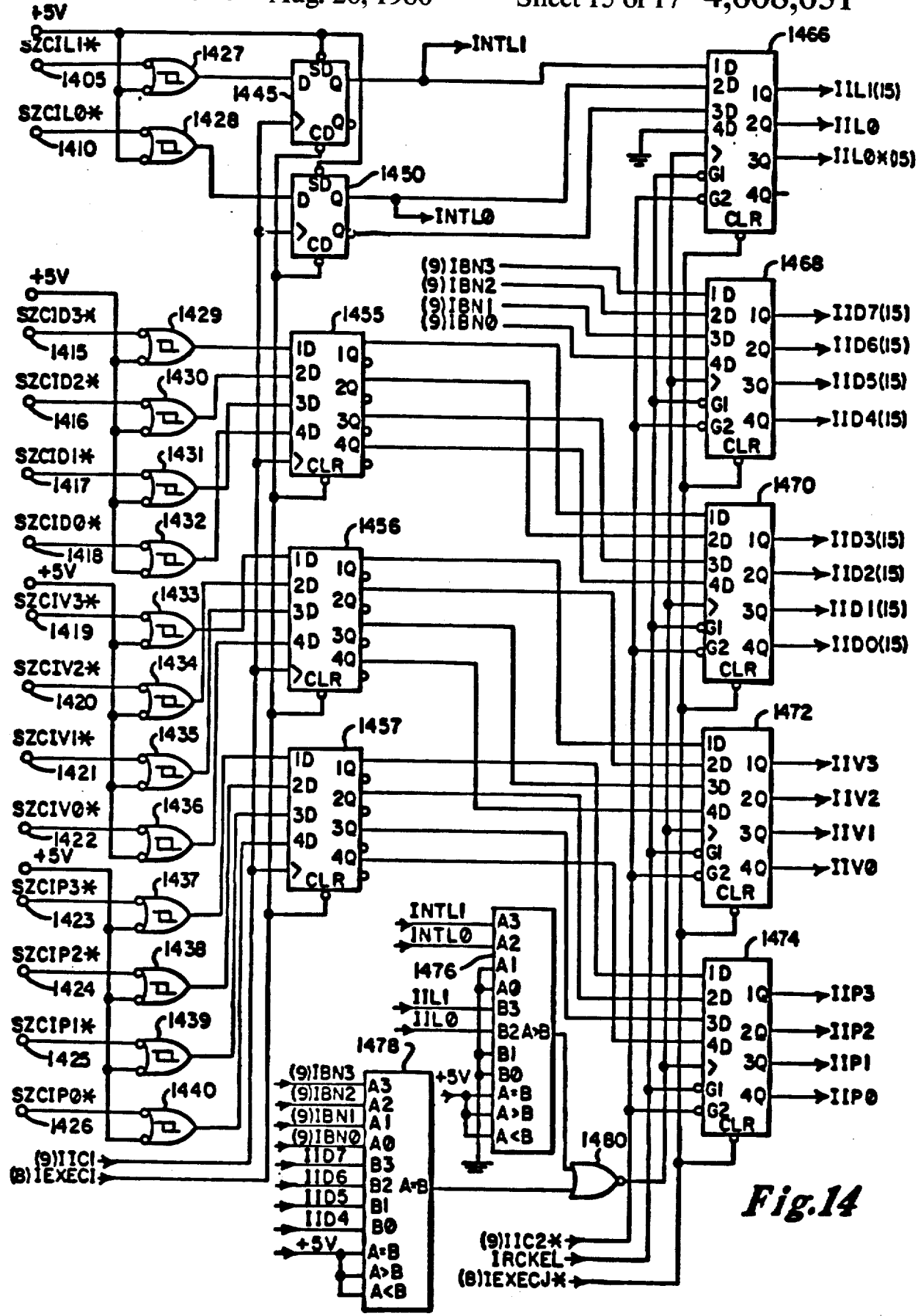
FIG. 14 is a detailed shematic circuit diagram of the external interrupt prioritizer circuitry for a master interface unit.
Figure 15:
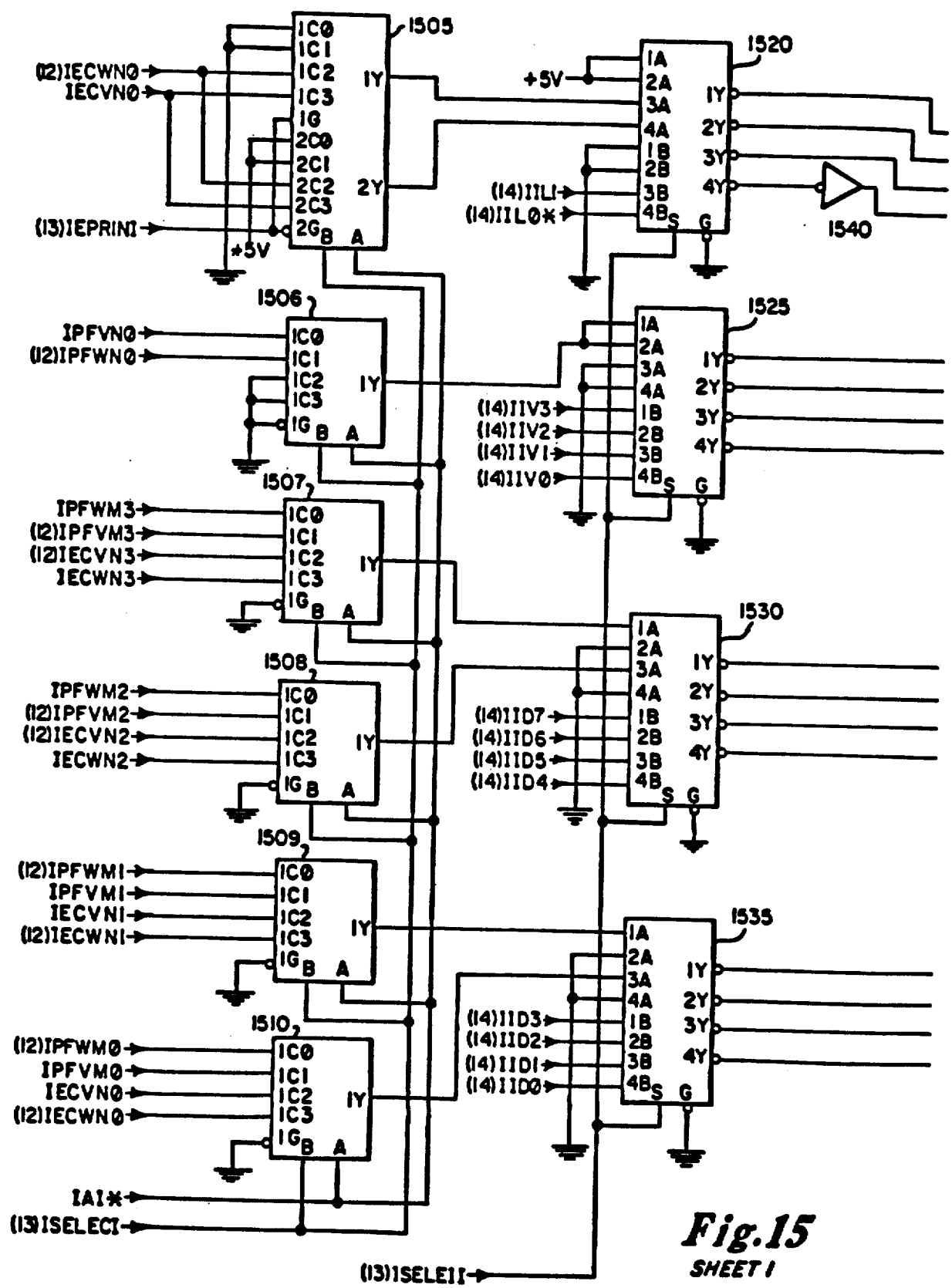
FIG. 15 consists of two sheets which when placed together show detailed shematic circuit diagram of the interrupt output circuitry for a master interface unit.
Figure 15:
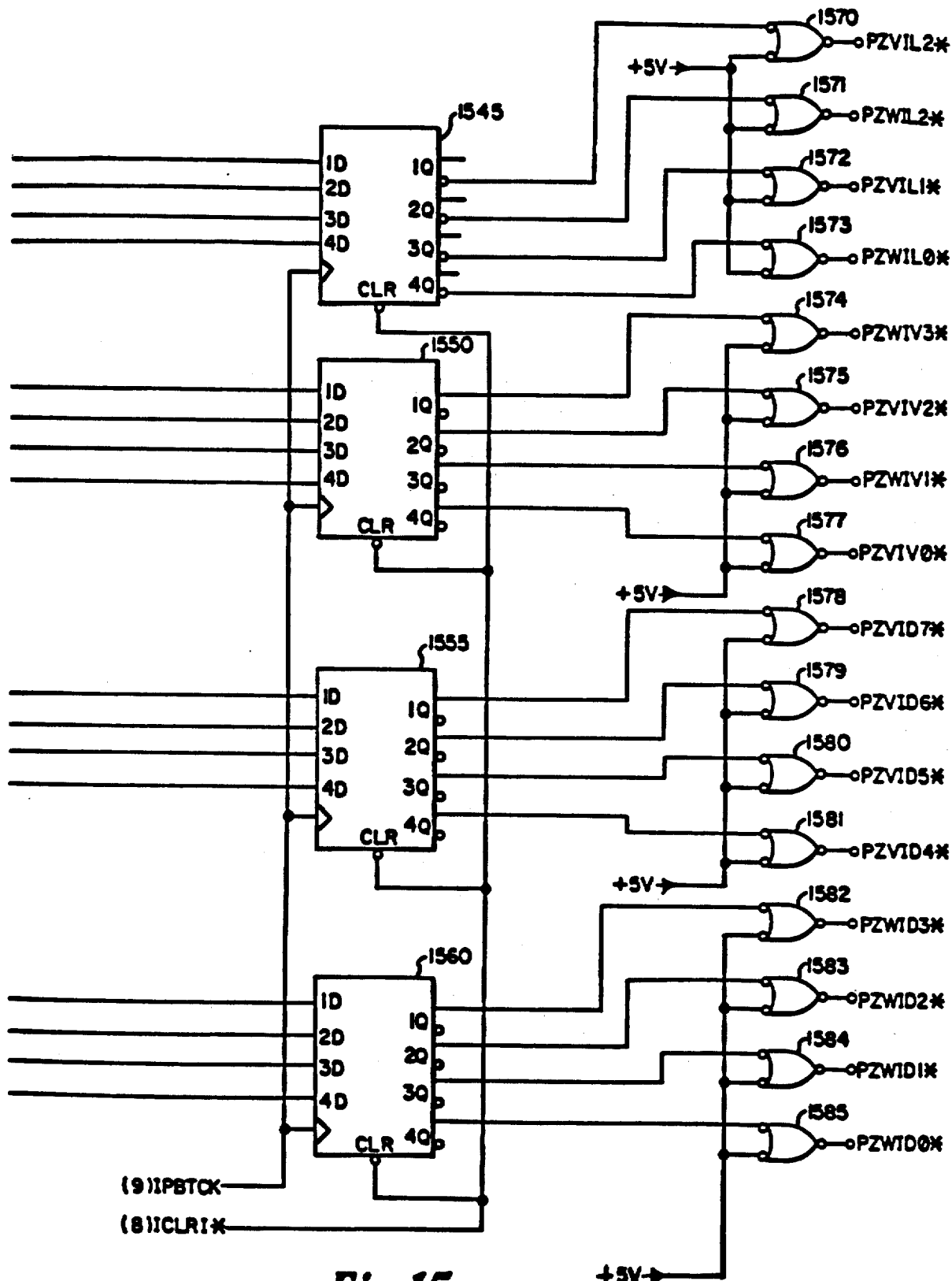

FIGS. 8 through 15 show the detailed circuitry for a master interface unit. As previously described, the master interface unit connects the processor buses with the system buses and contains circuitry which coordinates the change of executive control among processors and the exchange of information between the memory elements/peripheral units and the processors by means of interrupts. The master interface circuitry includes the following circuits which are shown in detail: bus interfaces (portions shown in FIGS. 8, 10, 11, 13, 14 and 15); executive bus controls 1 and 2 (FIG. 8); bus arbiter logic and executive processor request logic (FIGS. 9 and 10); register files (FIGS. 11 and 12); and interrupt circuitry (FIGS. 13, 14 and 15). The remaining portions of the circuitry (sequence and control logic, parity checker and reset/power clear logic) are of well-known design and will not be discussed further herein. In addition, for reliability purposes, many of the below-described circuits may be duplicated in the illustrative embodiment. Where the outputs of the duplicated circuits are combined in special ways the duplicated circuits are described; otherwise duplicated circuits are omitted for clarity.

In the following circuit description several conventions are used to simplify and clarify the text. For example, signals are referred to by the leads on which they exist—a signal on the IA1 lead is called the IA1 signal. A signal or lead name with an initial capital "I" is used internally in the master interface circuitry (for example, IA1. A signal with a number preceeding the signal name in parentheses indicates the signal was generated by circuitry shown in the numbered figure (for example, (9)IA1 indicates the signal was generated by circuitry shown in FIG. 9). Similarly, a signal name followed by a number in parentheses indicates that the signal is forwarded to circuitry shown in the Figure number (for example, IA1(7) indicates that the IA1 signal is sent to circuitry shown in FIG. 7). Signals which are active in their low voltage state are indicated by an "*" (for example, IA1* is active when "low"); signals which are active when in their high voltage state are not folllowed by an "*".

In addition, the master interface circuitry is synchronized by clocking signals that are generated by standard clocking circuitry which has been omitted from the description for clarity. In particular, most of the master interface circcuitry is clocked by a "receive clock" signal (IRCK) which is synchronized to the arrival of data and address information on the processor and system buses. This clock signal is a square- wave signal at approximately a 10-megahertz frequency. Some additional clocking signals are used to avoid timing skew and logic races. These signals include a signal IRCKEL which is the IRCK clock signal delayed by several nanoseconds, and the IRCKD50 and IRCKD60 clock signals which are the IRCK signal delayed by 50 and 60 nanoseconds, respectively. The IRCKD50 and IRCKD60 signals establish a "window" to insure that other signals generated by the master interface circuitry (as will be hereinafter described) are synchronized with the transmission and reception circuitry for some of the buses.

Figure 8:
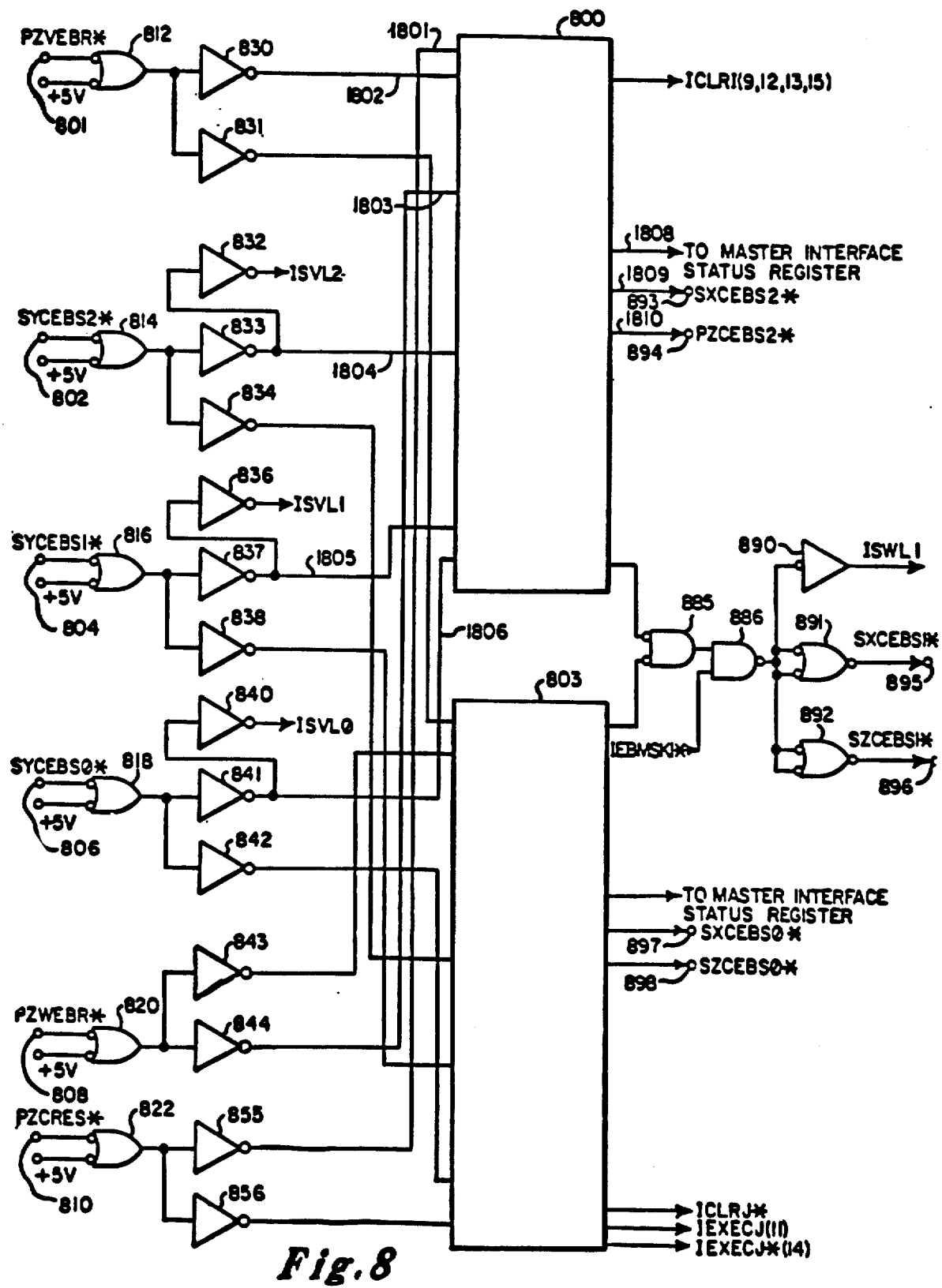
FIGS. 8 and 8A are detailed shematic circuit diagrams which together show the executive bus control logic circuitry for a master interface unit.
Figure 8A:
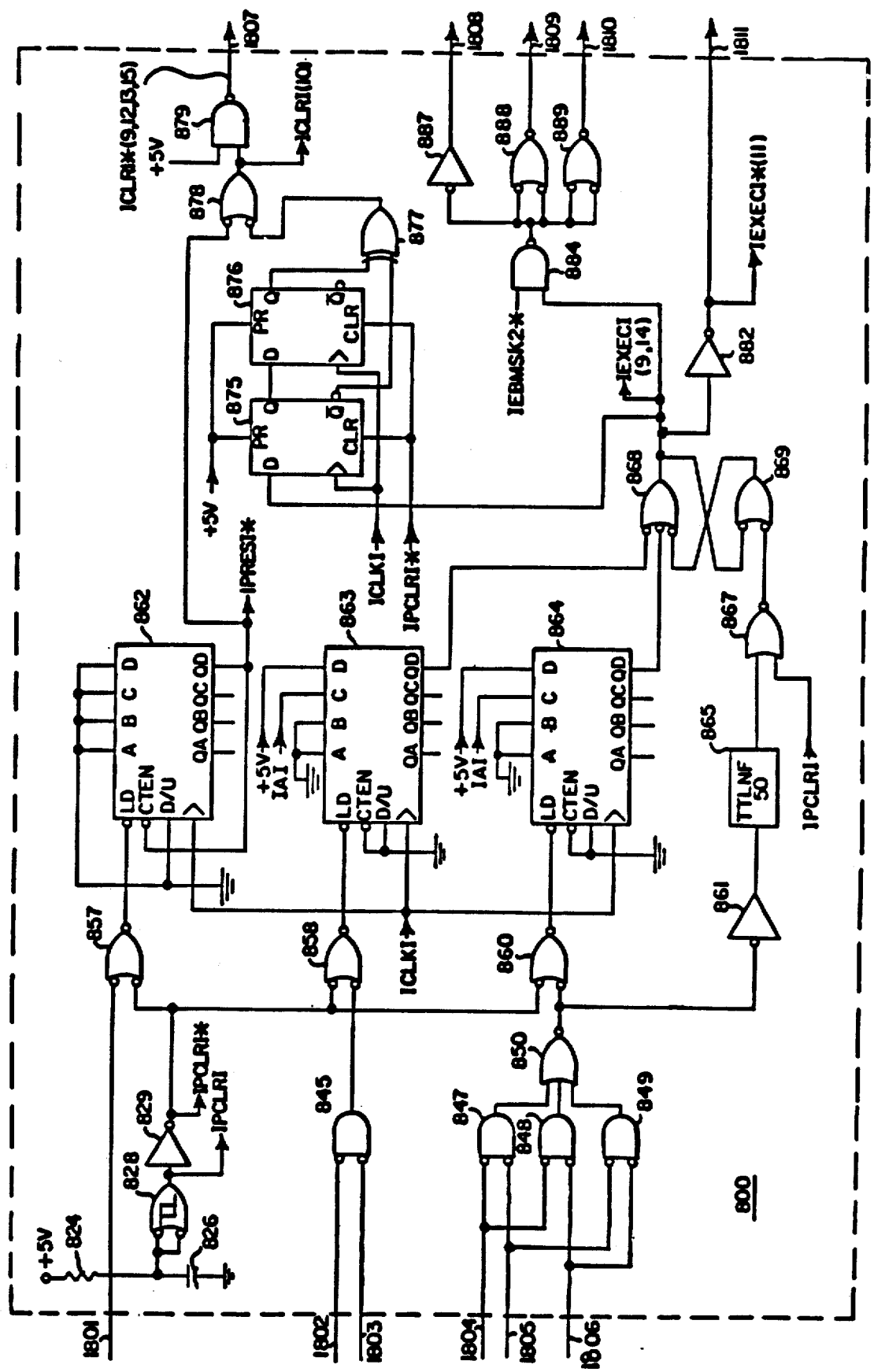

The executive bus control circuitry is shown in detail in FIGS. 8 and 8A. As previously described, this circuitry determines which of the duplicate redundant master interface units assumes the executive role when the computer system is powered on or reset or if one of the master interface units fails. For reliability purposes, a portion of the bus control circuitry is divided into two identical halves, 800 and 803, the detailed circuitry of which is shown in FIG. 8A. As will be hereinafter described, the outputs of the two circuit halves are combined so that no single failure in either half can cause the master interface to erroneously attempt to assume executive control.

In particular, the executive bus control logic receives request signals from the processing elements via the processor buses, which signals request the present executive master interface unit to relinquish executive control to the alternate master interface unit. If, during the operation of the computer system, any processing element detects an error which indicates that either the executive master interface or the associated processor bus has failed, the processing element will place a request to the non-executive master interface to cause it to assume the executive role. More particularly, this request is received by the master interface unit over the processor bus at terminals 801 and 808. Terminals 801 and 808 are connected, via the processor buses, in parallel to all processing elements. There are two terminals since, as previously mentioned, each processing element has two identical halves. In order for the master interface to respond to the request, both termnials must be asserted simultaneously.

In order to request a change in executive control, a processing element places "low" signals on leads PZVEBR* and PZWEBR*. These "low" signals are applied to terminals 801 and 808, respectively, and from there to Schmitt trigger threshold gates 812 and 820, respectively. Gates 812 and 820 (part of the processor bus interface) are well-known circuit devices which reduce sensitivity to noise on the buses to prevent erroneous operation. The other input of gates 812 and 820 is connected to positive 5 volts. Therefore, if the input signal on terminals 801 and 808 is below the threshold level of gates 812 and 820, respectively the gates produce a "high" output. The high output of gate 812 is inverted as a "low" output by inverters 830 and 831, and the "high" output of gate 820 is inverted by inverters 843 and 844. The output of invertor 830 and the output of inventor 844 are applied, via leads 1802 and 1803, to the inputs of gate 845 shown in FIG. 8A. If both inputs are "low", signifying that both halves of a processing element are requesting a transfer of executive control, gate 845 produces a "high" signal which is applied to the lower input of gate 858. Similar circuitry is found in the redundant circuit 803.

In response to a "high" signal at its lower input, gate 858 produces a "high" signal which is applied to the "load" input (LD) of counter 863. Counter 863 is a presetable 4-bit binary up/down counter which is a well-known logic circuit device. More particularly, in response to the "high" signal at its LD input, counter 863 begins counting, however, previous to a "high" signal being provided to its LD, input counter 863 was loaded or preset to the value of the signals appearing at its A, B, C and D inputs. Inputs A and B are grounded and input D is connected to positive 5 volts. Input C is connected to signal lead IAI. This lead is connected to a pin on the electrical socket into which the executive control logic circuit board plugs. In particular, the actual signal on the IAI lead depends on which interface slot the master interface unit is plugged into. For one master interface unit the signal on lead IAI is "high" and on the alternate unit the signal on lead IAI is "low". Therefore, the counter on one unit is preset to the number 12 and the counter on the other unit is preset to number 8.

Since the down/up input (D/U) of counter 863 is connected to ground along with the count enable (CTEN) input, counter 863 will count up under control of clock pulses applied via the internal clock lead ICLKI. Therefore, after a delay of either four or eight clock pulses, depending on which physical slot the master interface is inserted, counter 863 (which is a modulo-16 counter) will produce a "low" signal on its output QD which signal is applied to the upper input of gate 868.

Gates 868 and 869 are arranged in a flip/flop arrangement and the flip/flop is set by the "low" signal appearing at its input. The flip/flop comprised of gates 868 and 869, when set, generates a "high" signal on lead IEXECI(9, 14) which indicates that the upper half of the executive control is attempting to assert executive control. The "high" signal on lead IEXECI is applied to the upper input of NAND gate 884. Gate 884 also receives a signal on lead IEBMSK2* at its lower input. The IEBMSK2* signal is a mask signal that is used for test purposes and is normally "high" enabling gate 884. Gate 884 thereupon produces a "low" signal at its output.

The "low" signal at the output of gate 884 is provided to gates 887, 888 and 889 (which form part of the processor bus interface circuitry). Gates 888 and 889 are driver gates which drive the signal lines of one system bus and one processor bus to forward the signal to the processing elements and the other master interface unit. The "low" signal at the output of gate 884 is inverted by inverter 887 and provided to a register in the master interface status register file which registers that the upper half of the master interface is requesting executive control. The "low" signals on terminals 893 and 894 are provided via the system bus (over line SXCEBS2*) to the alternate master interface and via the processor bus (over line PZCEBS2*) to the processing elements, respectively.

In order to ensure that a failure in the internal circuitry of one half of the master interface does not erroneously cause the master interface to attempt to assume executive control the "high" output of the flip/flop comprised of gate 868 and 869 is also inverted by inverter 882 and applied as a "low" signal to the upper input of gate 885. The lower input of gate 885 receives a similar signal (if the lower half of the circuit has also responded to the request from a processing element by asserting executive control) from circuitry in the redundant portion 803 of the master interface. Assuming that both halves of the circuit are functioning properly, "low" signals will appear on both inputs of gate 885 which will, in turn, apply a "high" signal to gate 886 which is enabled by a mask signal appearing on lead IEBMSK1* (the IEBMSK1* signal performs a test function similar to the IEBMSK2* signal). In response thereto, gate 886 will apply a "low" signal to inverter 890. The "low" input to inverter 890 is applied as a "high" signal to the internal status register. In response to the "low" output of gate 886, gates 891 and 892 apply a "low" signal to terminals 895 and 896. The signal on terminal 895 is provided via the system bus (over line SXCEBS1*) to the other master interface unit and likewise the signal on terminal 896 is provided via the processor bus (over line PZCEBS1*) to the processing elements.

Identical circuitry to that previously described in redundant unit 803 also produces "low" signals on terminals 897 and 898 which are provided to the alternate master interface and to the processing elements, respectively on lines SXCEBS0* and PZCEBS0*.

As previously described, in order to assume executive control two of the three executive control signals produced by the master interface circuit must agree. Therefore, signals on terminal pairs 893/894; 895/896 and 897/898 must be such that two of the signals are "low" for the master interface to assume executive control. Normally, all of the signals will be "low" simultaneously since both halves of the master interface units will produce "low" signals in reponse to processing element requests. Should a malfunction cause one half of the circuit to erroneously produce an executive bus signal while the other half of the bus signal does not produce an executive bus signal, gate 885 will be disabled and will not produce an executive bus signal. Therefore, only one of the three output signals will indicate that the master interface unit is attempting to assume executive control. A similar result occurs if there is a failure in gate 885—only one signal is affected. As will be hereinafter described, unless two of the three signals indicate that the master interface unit is requesting control these signals will be ignored by the alternate master interface unit.

In particular, the three output signals from the alternate master interface unit are received via lines SYCEBS0* SYCEBS2* from the system bus over terminals 806, 804 and 802, respectively. These signals are filtered by gates 818–814, respectively, and inverted by inverters 832–842. The filtered and inverted signals are provided to gates 847, 848 and 849 (and similar gates in the duplicated circuit half 803). The signals are also inverted by inverters 832, 836 and 840 and provided as signals ISLV2-ISLV0 to internal status registers. Gates 847–849 together with NOR gate 850 provide a "majority logic" circuit which provides a "low" output at gate 850 if at least two of the three signals at terminals 802-806 are "low". The "low" output of gate 850 is inverted by inverter 861 and applied to a TTL noise filter module 865 which insures that noise pulses do not interrupt the operation of the circuitry. After a short delay, a "high" signal is provided at the output of circuit 865 to the upper input of NOR gate 867 which, in turn, applies a "low" signal to the lower input of gate 869, clearing the internal "executive flip/flop". The clearing action causes the upper half of the master interface to apply a "high" signal to its executive control outputs indicating that it has relinquished executive control.

Similarly, if a master interface relinquishes executive control, due to a failure or otherwise, then its executive control outputs become "high" and the "high" signals are conveyed to the other interface. In response to these "high" signals, the output of NOR gate 850 will become "high" causing gate 860 to produce a "high" signal which is applied to the load input, LD, of counter 864. Counter 864 operates in an identical fashion to counter 863 and, after a predetermined time delay which is determined by the position of the master interface in its electronic connector, counter 864 will produce a "high" signal on its output QD which sets the internal executive flip/flop comprised of gates 868 and 869 which, in turn, causes the master interface to assume executive control.

Also included in the executive bus control logic is a power-on/reset circuit which resets all of the internal counters and circuitry upon system power up or when the module is inserted into an operating system. In particular, each half 800, 803 of the circuitry is provided with an R.C. time constant delay circuit which provides a clearing pulse for the internal circuitry. In circuit 800 this R.C. time delay is provided by resistor 824 and capacitor 826. Initially, upon power up, capacitor 826 is discharged, providing a "low" signal to the inputs of gate 828. This "low" signal produces a "high" signal at the output of gate 828, which "high" signal is inverted by invertor 829 to produce a "low" signal on lead IPCLRI*. After a short time delay, capacitor 826 charges to the threshold voltage of gate 828, which, thereupon, produces a "low" signal on its output. The "low" signal is inverted by inverter 829 to produce a "high" signal on lead IPCLRI*. The "low" signal on lead IPCLRI* is applied to one input of gates 857, 858 and 860. These gates, in turn, provide a "low" signals to the load inputs of counters 862, 863 and 864, thereby presetting the counters and causing them to perform a parallel load operation from the A, B, C, and D inputs.

The operation of counters 863 and 864 after a parallel load operation have been previously described. Counter 862 is used to provide a minimum pulse width on internal reset and clear signals. In particular, its inputs A, B, C and D are connected to ground and therefore the counter begins counting at zero. The output, QD is used to control the remainder of the reset circuitry and a "low" signal thereon causes reset signals to be generated. The reset signals are present for a minimum period of eight counts of clock ICLKI. Clock signal ICLKI is generated by a 10-megahertz free-running clock which is used to control the reset circuitry of the master interface units. More particularly, under control of clock signals applied via lead ICLKI, counter 862 begins counting up and after 8 counts, a "high" signal appears at its QD output which is signals the end of the reset period and stops counter 862 via its count enable input CTEN. During the counting period the "low" signal on lead IPRESI* is applied to the upper input of gate 878. This causes gate 878 to apply a "high" signal to lead ICLRI(10) which "high" signal is inverted by gate 879 and applied as a "low" signal to lead ICLRI*(9, 12, 13, 15). The "low" signal on this lead is provided, via lead 1807, to reset portions of the master interface unit when power is first applied or during a reset.

ICLRI/ICLRI* reset signals are also generated when the master interface unit either assumes executive control or relinquishes that control. In particular, the executive control signal on lead IEXECI(9, 14) is applied to the D input of flip/flop pair 875/876. The Q output of flip/flop 875 is connected to the D input of 876 and both flip/flops are clocked by internal clocking signal ICLKI. Both flip/flops may also be cleared by a clear signal appearing on lead IPCLRI*. The Q output of flip/flop 876 and the Q* output of 875 are connected to the inputs of exclusive OR gate 877. Therefore, in the "steady state" condition, the outputs of flip/flop 875 and 877 will be the same. Since the lower input of gate 877 is connected to the inverting output of flip/flop 875, gate 877 will produce a "high" signal which is applied to the lower input of gate 878 and, therefore, gate 878 does not respond. During a change of executive control, however, the outputs of flip/flops 875 and 876 will be different, causing exclusive OR gate 877 to apply a "low" signal to the lower input of gate 878 which, in turn, will generate a clearing signal as previously described.

Figure 9:
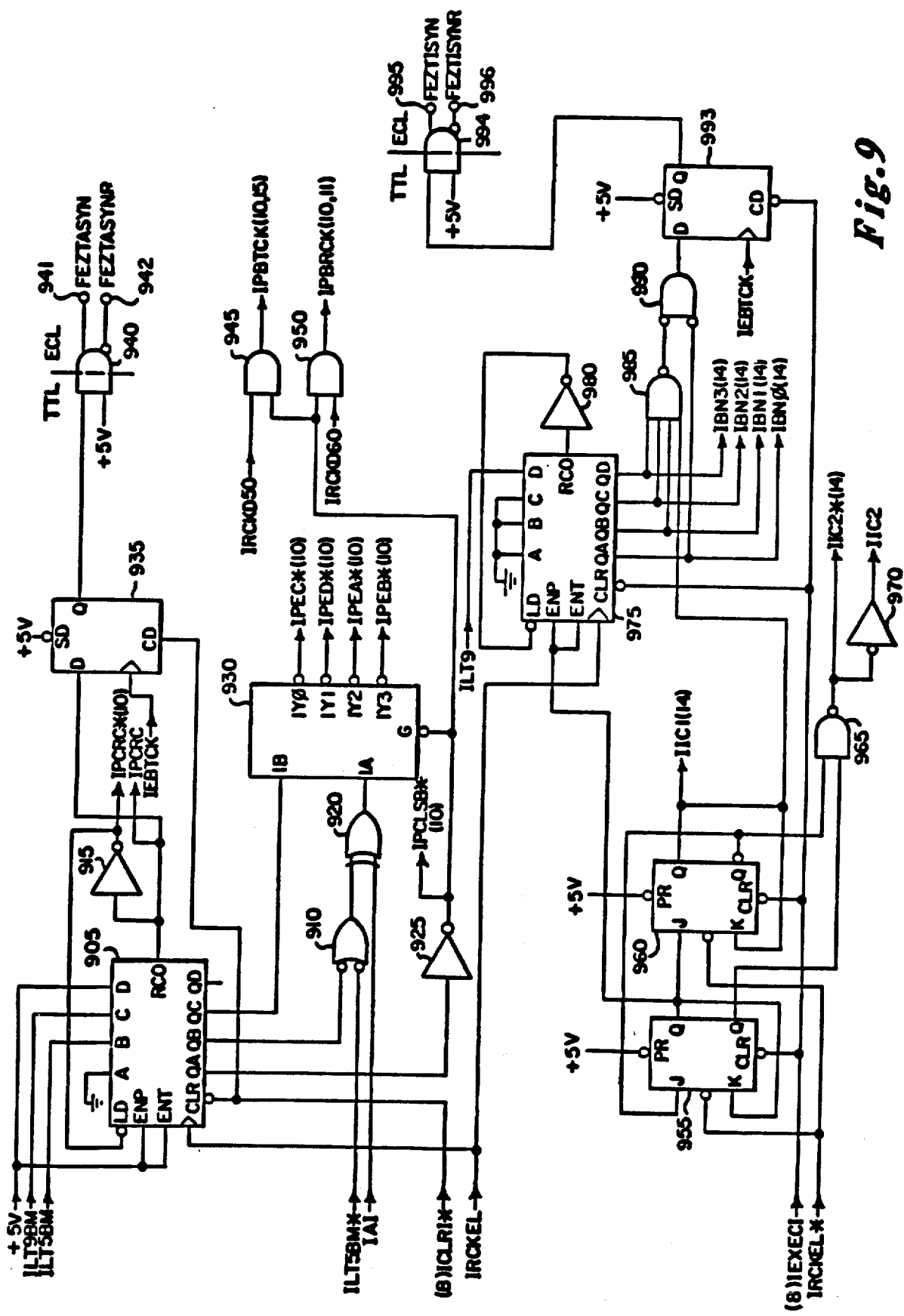
FIG. 9 is a detailed shematic circuit diagram of the bus access request/executive processor request polling circuitry for a master interface unit.
Figure 10:
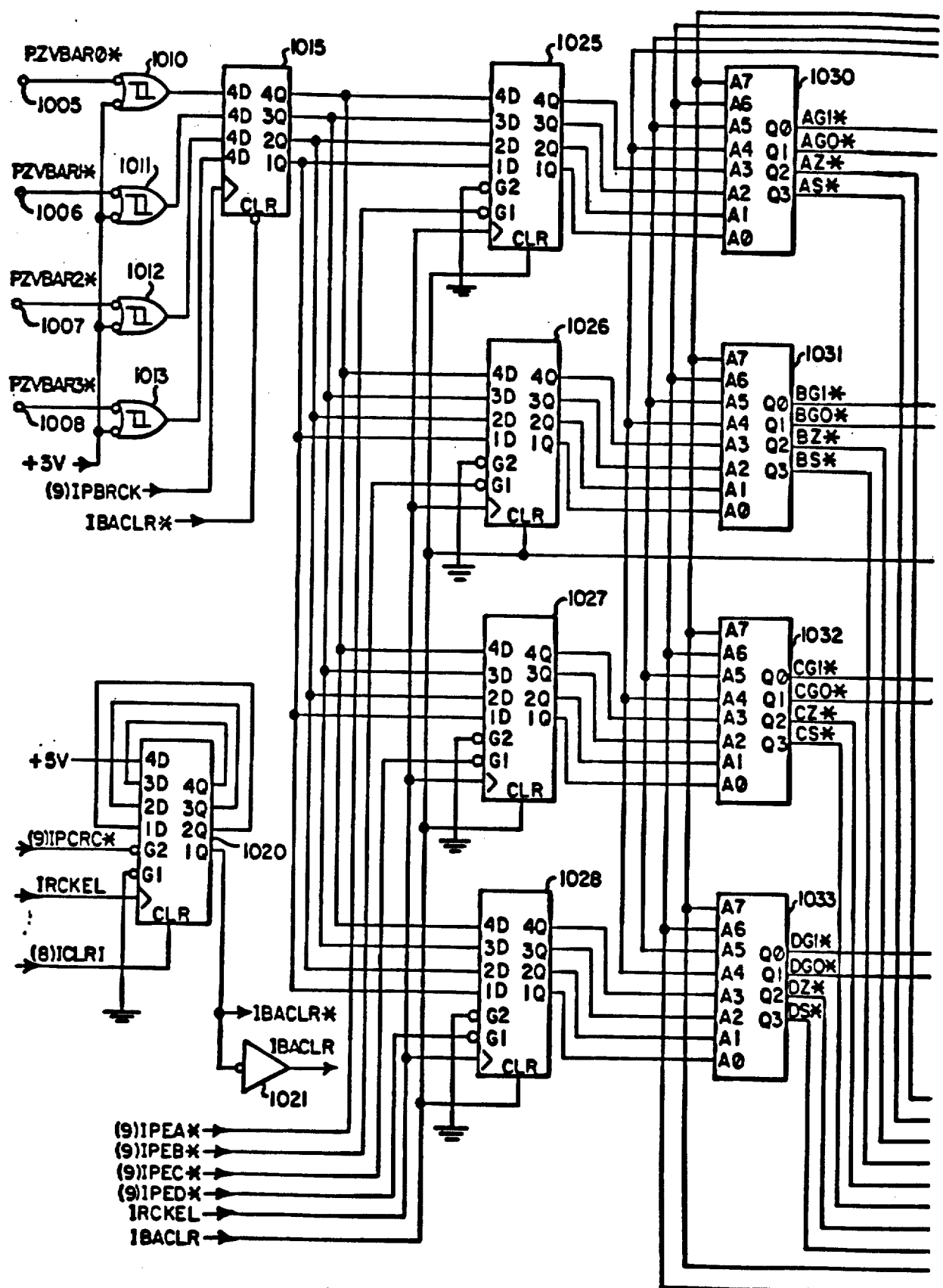
FIG. 10 consists of two sheets which when placed together show a detailed shematic circuit diagram of the bus arbiter logic for a master interface unit.
Figure 10:
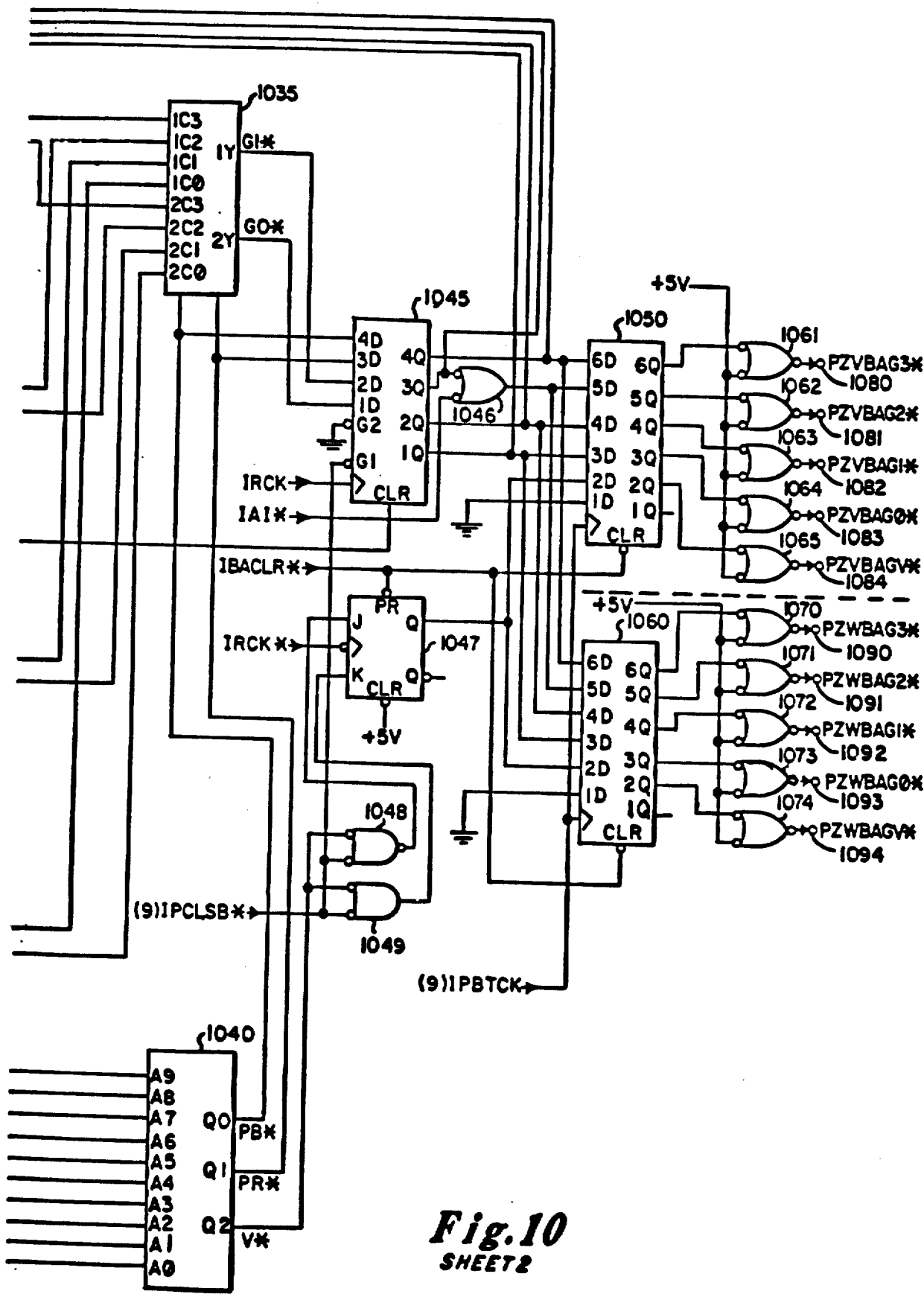

FIGS. 9 and 10 show the detailed circuitry which is used by the master interface unit to process bus access requests and executive processor requests generated by the processing elements. In addition, FIG. 9 also shows a portion of the circuitry used to process "external" interrupt requests received from the slave interface units.

In the illustrative computer system, the processing elements communicate with the remainder of the system via the processor buses. As previously explained, access to the processor buses is controlled by the master interface units. Accordingly, the master interface unit must be able to handle bus access requests generated by the processors on a reasonably efficient basis in order to prevent the processor buses from becoming a bottleneck to the computing process. Normally, such a request scheme would operate either on a full parallel or strictly serial basis. However, in the present system, which can accommodate up to 16 processing elements per processor bus, a fully parallel arrangement would require 32 leads to be dedicated to servicing bus access requests (16 leads for receiving requests and 16 leads for acknowledging one request). A serial polling arrangement could also be used, however, this arrangement is much less time-efficient than a complete parallel arrangement and could cause serious delays in the illustrative embodiment if used to service bus access requests.

However, in accordance with another aspect of the present invention, a combination/serial request processing scheme is used to obtain the advantages of fully parallel request processing without requiring a full complement of 32 leads. In particular, each processing element is assigned to a "bus access group". Each bus access group contains up to four processing elements. If there are only four processing elements present in the system one bus access group is used. If there are five to eight processing elements associated with the computer system, two bus access groups are used. For more than eight processing elements, four bus access groups are used. Each bus access group is, in turn, assigned a polling interval or "time slot" during which the processing elements associated with that bus access group make bus access requests to the master interfaces.

A processing element generates bus access requests by placing a signal on a bus access request lead permanently assigned to that processing element. However, since there are only four processing elements assigned to each bus access group, at most only four such bus access request lines are necessary. Therefore, all processing elements make bus access requests utilizing the same four bus access request lines in cyclic polling intervals or time slots.

After all bus access groups have been given a chance to make bus access requests, a synchronization signal is sent from the master interface to each processing element which synchronizes the system to the polling interval zero and causes those processing elements associated with polling interval zero to initiate bus access requests. In particular, the synchronization signal causes all processors to load their associated identification number to a counter. This counter is then counted down to determine to which bus access group the processor belongs.

In addition, bus access requests are "pre-granted" in that requests are granted before the bus is actually available. The processing element who is granted bus access then, as previously described, monitors the bus control leads to determine when the bus is actually available. In this way very little time is wasted in transferring control of the bus from one processing element to another.

Since bus access requests are, in effect, multiplexed on four request lines, circuitry must be provided in the master interface units for de-multiplexing or decoding the signals on the four lines. This circuitry is shown in the upper half of FIG. 9 and FIG. 10. The bus access polling circuitry is shown in the upper half of FIG. 9, the lower half shows circuitry associated with interrupt processing which will be described later.

In particular, the upper half of FIG. 9 shows the poll counter used for bus access requests and executive processing element requests generated by the processing elements. The polling intervals or time slots are generated by a counter 905 which is a conventional 4-bit synchronous binary counter. The counter may be preset from its input A, B, C and D when a "low" signal is applied to the load input LD. Counter 905 receives signals which indicate the number of polling intervals which are to be used with the present configuration in the computer system (dependent on the number of processing elements which are operable). Each poll period is equal to two clock periods of the IRCKEL clock signal.

Specifically, the number of polling periods is determined by signals applied to leads ILT9BM, ILT5BM and ILT5BM* by jumpers connected to appropriate signal sources. Counter 905 is capable of generating three different sequences depending on the number of processing elements present in the computer system—there are different polling periods if there are four or less processing elements, between five and eight processing elements and greater than eight processing elements. If there are less than five processing elements, the signal on lead ILT5BM is "high". Similarly, if there are less than nine processing elements the signal on lead ILT9BM is "high". If signals on both leads ILT5BM and ILT9BM are "low", this indicates that there are greater than nine processing elements.

The signals on lead ILT9BM and ILT5BM are applied to the presetting inputs of counter 905 and determine the starting count of the counter. The counter increases its count under control of the clock signal IRCKEL. Counter 905 counts from its starting count until it reaches a terminal count of 15 at which time a "high" signal appears on output RC0 which "high" signal is inverted by invertor 915 and applied as a "low" signal to the load input LD, thereby presetting the counter to the initial count and beginning the cycle again. The low signal at the output of inverter 915 is applied to lead IPCRC*(10) which is used to reset portions of the bus arbiter circuitry.

The "high" signal appearing at output RC0 of counter 905 is also applied to the D input of flip/flop 935. Flip/flop 935 is clocked by a clocking signal appearing on lead IEBTCK which establishes a window for the synchronization pulse to in sure that it will operate properly with the processor bus circuitry which is ECL logic. The output of flip/flop 935 is applied, via gate 940, to terminals 941 and 942. The signal on terminals 941 and 942 is, in turn, applied, via line FEZTASYN in the processor bus, to the processing elements in order to synchronize their internal counters to begin the polling process. Gate 940 converts the TTL logic level signals produced by flip/flop 935 into ECL logic level signals which are used on portions of the processor bus.

The outputs of counter 905 ar provided to gates 910 and 925 and the "1B" input of one-out-of-four decoder 930. The lower input of gate 910 is provided with the ILT5BM* signal and the output of gate 910 is, in turn, provided to exclusive OR gate 920. Exclusive OR gate 920 compares the output of gate 910 with the signal on the IAI lead whose logical value depends, as previously described, on the physical location of the master interface unit circuit board in its electrical connector. The output of gate 920 is, in turn, connected to the 1A input of one-out-of-four decoder 930.

Decoder 930 is a conventional logic circuit which places a "low" signal on one of its outputs 1Y0–1Y3 in response to the value of a the binary code applied to its input 1A and 1B and a "low" signal applied to its enable input, G. The G input of decoder 930 is, in turn, connected to the output of invertor 925. Therefore, decoder 930 is controlled by counter 905 to produce a sequence of timing signals on its outputs, 1Y0–1Y3, in accordance with the selected polling period.

In particular, if there are less than five processing elements, a "low" signal is placed on decoder output IPEA*(10) every other IRCKEL clock pulse Leads IPEB*(10)-IPED*(10) are held "high". As will be hereinafter described these signals result in one polling interval Alternatively, if there are between five and eight processing elements in the illustrative computer system, "low" timing signals are applied alternately to leads IPEA*(10) and IPEB*(10) creating two polling periods. For more than eight processing elements in the illustrative computer system, low signals are sequentially placed on leads IPEA*(10) - IPED*(10). These timing signals are used, as will be hereinafter described, to control bus arbiter logic which decides which processing element will be granted access to the bus.

The timing signal appearing at output of invertor 925 (signal IPCLSB*(10), used for a timing signal for other portions of the circuitry) is, in turn, applied to gates 945 and 950. These gates are enabled by timing signals which consist of the clock IRCK delayed by fifty nanoseconds and sixty nanoseconds (appearing on leads IRCKD50 and IRCKD60, respectively) and generate two delayed timing signals on leads IPBTCK(10, 15) and IPBRCK(10, 11) which are also used to control the operation of the bus arbiter logic, as will be hereinafter described.

The logic which selects a requesting processo for bus access is shown in detailed schematic form in FIG. 10.

As previously mentioned, in accordance with another aspect of the invention, bus access requests are pre-granted or granted prior to the time the bus becomes available so that little time is lost in transferring control from one processing element to another. Specifically, new bus access requests are clocked into latches 1025-1028 and processed, as described below, by arbitration programs in ROMs 1030-1040. In the meantime, the bus is controlled by the processing element whose identity is stored in latches 1050 and 1060. As soon as the processing element currently granted bus access lowers its request line, a new processing element identification number is clocked into latch 1045. Subsequently, the contents of latch 1045 are transferred to latches 1050-1060 to pre-grant control of the bus.

More specifically, bus access requests generated by the processing elements are provided to the master interface over its associated processor bus on lines PZVBAR0*-PZVBAR3* and appear on terminals 1005-1008. In accordance with the inventive polling scheme described previously, all processing elements provide bus access request signals on one of these four lines during their associated polling interval.

The request signals are first filtered by Schmitt-Trigger threshold gates 1010-1013. The filtered signals are then provided to the 1D-4D inputs of 4-bit latch 1015 and clocked into the latch circuitry by the signal (9)IPBRCK.

The signals appearing at output latch 1015 are, in turn, clocked into one of four additional latches, 1025-1028, depending on the polling interval during which the signals occur. In particular, latches 1025-1028 are controlled by the timing signals (9)IPEA* - (9)IPED* generated by the aforementioned polling counter circuitry. The signals (9)IPEA* - (9)IPED* are provided to the enable input, G1, of latches 1025-1028. Therefore, assuming that there are more than eight processing elements in the computer system, bus access requests generated by processing elements assigned to the first polling interval would be clocked into latch 1025; bus access requests generated by processing elements assigned to the second polling interval would be clocked into latch 1026; bus access requests generated during the third polling interval would be clocked into latch 1027 and bus access requests generated during the fourth polling interval would be clocked into latch 1028. Bus access request signals are actually clocked into latches 1025-1028 by the IRCKEL clock signal.

The outputs, 1Q-4Q, of each latch circuit are connected to the address inputs, A0-A7, of a corresponding ROM. Each of ROMS 1030-1033 is a 256 by 4-bit word ROM which implements the arbitration algorithm used in the computer system. ROMs 1030-1033 are conventional read-only memory devices which are commercially available and programmed according to well-known techniques. Although many different algorithms can be programmed into ROMs 1030-1033, an algorithm suitable for the illustrative embodiment is a cyclic arbitration algorithm in which each processing element is assigned a number and processing elements are assigned bus access in numerical order. Under this arrangement, the processing element which has most recently had use of the bus has lowest priority for the next bus access.

ROMs 1030-1033 also receive four address signals from the output of latch 1045 indicating the identification number of the processing element currently controlling the bus. In response to the address signals, each of ROMS 1030-1033 select the processing element which is requesting bus access and has the highest priority out of the group of four processing elements whose requests it is examining. In particular, each ROM of ROMS 1030-1033 has four outputs, Q0-Q3. In response to information appearing at the address inputs, and the internal programming, the Q0 and Q1 outputs produce the two lowest-order bits of the identification of the processor which has the highest priority in the group of four and is requesting bus access. Outputs Q2 and Q3 produce a code which indicates whether there are any requesters in the group and, if so, whether there is a requester having the highest priority among all possible requesters.

The Q2 and Q3 outputs from each of ROMS 1030-1033 are provided to address inputs A2-A9 of an additional arbitration ROM 1040 which is similar to ROMs 1030-1033 except that it is slightly larger. ROM 1040 address inputs A0 and A1 are provided with information (from the output of latch 1045) indicating the identity of the bus access group which currently has control of the processor bus. In response to the information at its address inputs and its internal program, ROM 1040 selects one of the four groups of four processing elements which is to be granted bus access. ROM 1040 produces three outputs—two of the outputs (Q0 and Q1) are the two high-order of the four-bit processing element identification code of the processing element which will granted bus access. ROM 1040 also produces on its Q2 output a "valid" bit which indicates that the processing element I.D. appearing in the output latch is valid. The two processing element I.D. bits generated by outputs Q0 and Q1 of ROM 1040 are provided to the A and B inputs of dual 4-to-1 multiplexer 1035 and, in addition, to inputs 3D and 4D of intermediate latch 1045.

Multiplexer 1035 receives at its inputs 1C0-1C3 and 2C0-2C3 the two low-order processing element I.D. bits developed by ROMS 1030 and 1033 which identify the processing element to be granted bus access. Under control of the signals produced by ROM 1040 and applied to its selection inputs A and B, multiplexer 1035 selects the I.D. signals from one of ROMs 1030-1033, provides them at its outputs 1Y and 2Y which are, in turn, applied to the inputs of 1D and 2D of latch 1045.

Thus, the entire identification code of the processing element to be granted bus access is provided to the inputs 1D-4D of intermediate latch 1045 by ROM 1040 and multiplexer 1035. These inputs are clocked into the latch under control of the IRCK clock signal. Intermediate latch 1045 produces corresponding output signals on its outputs 1Q-4Q. These output signals are provided, as previously described, to ROMS 1030-1033 to indicate the identity of the processing element which last had access to the bus. The outputs of latch 1045 are also provided to the inputs 3D, 4D and 6D of output latch 1050. Output 3Q of 1045 is combined by exclusive gate 1046 with the input IAI* and provided to input 5D of latch 1050. The outputs of latch 1045 are also provided to output latch 1060. Latches 1050 and 1060 and their associated gates 1061-1065 and 1070-1074, respectively, are provided to transfer, under control of the (9)IPBTCK signal, the contents of the intermediate latch 1045 onto the processor buses via terminals 1080-1084 and 1090-1094. Signals on these terminals are provided via the bus access grant lines (PZVBAG0*-PZVBAG3* and PZWBAG0*-PZWBAG3*) to the processing elements indicating which processing element has been granted the access to the bus. An additional bit is provided, via gates 1065 and terminal 1084 and gates 1074 and terminal 1094, on processor bus lines PZVBAGV* and PZWBAGV* indicating that the processing element I.D. on the bus access grant leads is valid. As previously described, this bit is produced by ROM 1040 and is gated, via gates 1048 and 1049, under control of the signal appearing on lead (9)IPCLSB* into the J and K inputs of flip/flop 1047. From there the inputs are clocked into flip/flop 1047 by means of the IRCK* clock signal. The output of flip/flop 1047 is, in turn, clocked into transfer latches 1050 and 1060 by the (9)IPBTCK clock signal.

The bus arbiter logic can be cleared by means of the clear signals IBACLR and IBACLR* generated by a latch circuitry 1020. This latch is clocked by the IRCKEL clock signal and is enabled when a "low" signal appears on lead (9)IPCRC*. During a power clear or other reset operation a "high" signal appears on lead (8)ICLRI. This signal clears latch 1020 and produces a "low" output at all of its outputs 1Q–4Q. Output 1Q is connected to lead IBACLR*. A "low" signal applied to the lead IBACLR* is used to reset portions of the circuitry of the bus arbiter logic. The "low" signal is also applied, via inverter 1021, as a "high" signal to lead IBACLR which is used to reset other portions of the bus arbiter logic. After latch 1020 has been cleared by the signal on the (8)ICLRI lead, it begins clocking in information under control of the IRCKEL clock signal. The input and outputs of latch 1020 are connected so that a "high" signal is loaded into input 4D. This "high" signal circulates through the outputs 4Q, 3Q, 2Q and 1Q so that after four IRCKEL clock pulses occurring concurrently with the a "low" signal on the IPCRC* lead (clock enable), the clearing signals IBACLR* and IBACLR are removed.

FIG. 11 shows the circuitry associated with the executive processor request register which is part of the executive control word. This circuitry receives and processes requests generated by up to sixteen processing elements to become the executive processing element. In particular, the circuitry is arranged to accept incoming executive processing requests from four groups of processing elements, which requests are polled in the same manner as the bus access requests are polled. Four executive processor request lines, PZVEPR0*–PZVEPR3* convey information from the processing elements over the processor bus for up to sixteen processing elements. During a particular polling period, any of four processing elements assigned to that polling interval may place a request on the executive processor request lines of the processor bus which requests are received at terminals 1100–1103. The request signals are filtered by threshold gates 1110–1113 and clocked into holding latch 1115 under control of the (9)IPBRCK clock signal. Latch 1115 may be cleared by a signal on the (8)IEXECJ lead if the master interface is no longer asserting executive control.

The outputs of holding latch 1115 are provided to latches 1116–1119. More particularly, the outputs of latch 1115 are provided to one of latches 1116–1119 during each polling interval as determined by signals on leads (9)IPEA*-(9)IPED*. These signals, as previously described, are generated by the polling logic shown in FIG. 9. Thus, during each polling period executive processor requests for processing elements associated with that polling period are sampled and stored. At the end of four polling periods, an executive processor request from any of sixteen processing elements which may be requesting a transfer of executive control is stored in one of latches 1116–1119. The outputs 1Q–4Q of these latches are connected to an internal data bus and may be transferred to the processor buses by transfer circuitry (not shown) for reading by the executive processing element to determine the identity of processing elements requesting transfer of executive funnctions.

Latches 1116–1119 may also be cleared if the associated master interface is no longer asserting an executive role by a "high" signal appearing on lead (8)IEXECI*.

In addition, as shown in FIG. 11, the circuitry consisting of flip/flops 1130 and 1140 and gates 1125, 1132 and 1134 is provided in order to generate a control signal to the interrupt circuitry (described in detail below). This control signal causes the interrupt circuitry to generate an interrupt during a situation when no executive processor requests have been pending and a new executive processor request occurs.

More specifically, the inputs of gate 1120 are connected to the inverted outputs of holding latch 1115. A "low" signal appears at an output of latch 1115 when the corresponding processing element is requesting executive processor privileges. Any "low" signal applied to the gate of 1120 causes a "high" signal to be applied at its output to the J input of flip/flop 1130 and to the upper input of gate 1125. Thus, flip/flop 1130 will be set if any executive processor request is received during any polling interval.

The outputs of flip/flop 1130 are connected to the inputs of gates 1132 and 1134. Gates 1132 and 1134 are enabled by a "low" signal appearing on lead (9)IPCRC*. In particular, a "low" signal appears on lead (9)IPCRC* once per polling cycle and, therefore, the outputs of flip/flop 1130 are gated to the inputs of flip/flop 1140 once per cycle. More specifically, if flip/flop 1130 is "set", gate 1132 will be enabled applying a "high" signal to the J input of flip/flop 1140. Likewise, gate 1134 will be disabled, applying a "low" signal to the K input of flip/flop 1140. During the next appearance of an IRCK* clock pulse, flip/flop 1140 will be "set" applying a "low" signal to lead INEPR*(14) which signal is applied to the interrupt control network shown in FIG. 14 to cause an interrupt to be generated to the present executive processor.

Also, at the point when the outputs of flip/flop 1130 are being transferred to flip/flop 1140, flip/flop 1130 is reset by means of gate 1125. In particular, the terminal count signal appearing on lead (9)IPCRC* is applied to the lower input o gate 1125. Gate 1125 is therefore enabled and will apply a "high" signal to the K input of flip/flop 1130 to reset it if the output of gate 1120 is "low" indicating no pending executive request. If an executive request is pending and the output of gate 1120 is "high", gate 1125 is disabled thereby allowing the flip/flop to remain in, or be set to, its "set" state.

The flip/flops 1130 and 1140 may also be preset by means of a signal appearing on the IVALEI lead. This signal is generated by the status circuitry and is "low" when there is no valid executive processor. The "low" signal on this lead is applied to the preset inputs of flip/flops 1130 and 1140 and holds the flip/flops preset, thus preventing them from generating the interrupt request signal to the interrupt control circuitry.

FIG. 12 shows the circuitry associated with the page fault word register and the remainder of the executive control word (the register for storing the execuive processor requests is shown in FIG. 11). Also shown is an additional register which is used for temporarily holding data received from an internal data bus. The circuitry shown in FIG. 12 is one of two nearly identical halves (in the illustrative embodiment these halves are called the "I" and "J" halves and generate information on the "W" and "V" halves of the master interface internal data bus). Some "W" and some "V" signals are stored on each of the "I" and "J" halves. For clarity purposes only one half of the circuitry is shown; the other half contains identical circuitry with the exception that no parity registers are included. Each circuit half stores 16 page fault word bits and four executive control word bits.

In particular, data appearing on the internal data bus 1200 is provided to holding registers 1205–1220, each of which consists of a conventional 4-bit latch. The data is clocked into the latches by means of a clock signal on the lead IHLDCK which is generated by the master interface sequence and control circuit to synchronize the operation of the master interface.

Information held in the holding register can be either gated into the page fault word register or the executive control word register by means of clocking signals appearing on leads IPFWLDI and IECWLDI, respectively. These signals are also generated by the sequence and control logic in response to processing element commands to write information in the page fault word register or in the executive control word register, respectively. In response to a "high" signal appearing on the IPFWLDI lead, the outputs of latches 1205–1220 are loaded directly into the page fault word register consisting of latches 1240–1255. The output of these latter latches is then available on the master interface internal data bus where it may be transferred to the processor bus (by circuitry not shown) for reading by the processing elements Alternatively, selected input signals at the outputs of holding latches 1205–1225 can be gated to the executive control word register comprised of flip/flops 1270–1287. These flip/flops are, in turn, clocked by a signal appearing on the IECWLDI lead which is controlled by the synchronization and control logic in response to a command by the processing elements to write information into the executive control word register.

The holding register, page fault word register and executive control word register may all be reset by a "low" signal appearing on the (8)ICLRI* lead which is generated by the reset circuitry during a power up or other system reset as discussed in connection with FIG. 8.

Coded parity bits associated with the data on the master interface internal data bus is also stored in the page fault word register or in the executive control word register four parity bits for the page fault word information and two parity bits for the executive control word information). In particular, parity information appearing on leads IVRPK, IVRPM, IVWRPK and IWRPM on the internal data bus is clocked into holding register 1225 under control of the clock signal on lead IHLDVK. The information in register 1225 is, in turn, provided to the D inputs of registers of 1260 and 1265, 1290 and 1295. Registers 1260 and 1265 are dual D-type flip/flops whereas registers 1290 and 1295 are a single type flip/flop. The information at the outputs of registers 1225 is entered into registers 1260 and 1265 under control of the signal on the lead IPFWLDI or the signal on lead IECWLDI, respectively. Registers 1260 and 1265 may be either "set" or "cleared" under control of the signal on the (8)ICLRI* lead depending on the physical location of the master interface unit. If the board is in one particular location, a "high" signal appears on lead IAI and a "low" signal appears on lead IAI*. Gate 1235 is therefore disabled and gate 1230 is enabled when a "low" signal subsequently appears on lead (8)ICLRI*. Enabled gate 1230 produces a "low" signal which, in turn, "sets" flip/flops 1260 and 1295 and "clears" flip/flops 1265 and 1290.

Alternatively, if the master interface is plugged into a different physical location, gate 1235 is enabled and gate 1230 is disabled. Gate 1235 alternatively, "sets" flip/flops 1265 and 1290 and "clears" flip/flops 1260 and 1295.

Selected outputs of latches 1240–1255 and flip/flops 1270–1287 are provided to the interrupt circuitry shown in FIG. 15. The interrupt circuitry is separated into a data section and a parity section, and some signals generated by the circuitry in FIG. 12 go to the data portion of the circuitry shown in FIG. 15 and some to the parity portion (not shown). Likewise the circuitry in FIG. 15 also receives signals from the circuit portion corresponding to FIG. 12 which is not shown.

Circuitry which detects and services interrupt signals produced by the slave interfaces in response to service requests generated by the memory elements and peripheral elements is shown in FIGS. 9, 13, 14 and 15. In particular, interrupt requests are detected and processed by a polling arrangement similar to bus access requests and executive processor requests. The circuitry which generates the timing signals that establish the polling intervals is shown in the lower half of FIG. 9. In particular, each polling period is equal to three periods of the IRCKEL* clock signal. This latter clock signal is used to clock flip/flops 955 and 960. These flip/flops are connected to operate as a three-state counter. The output of flip/flop 960, which is "high" during every other state of the three-state counter, is provided as timing signal IICI(14) to the circuitry shown in FIG. 15. In addition, other timing signals are generated during one state of the counter in which both flip/flops are "set" by gate 965 which receives a "high" signal on both of its inputs. Gate 965, in turn, generates a "low" signal on lead IIC2*(14) and, via invertor 970, a "high" signal on lead IIC2 which timing signals are provided to the interrupt processing circuitry in FIG. 15 to synchronize the operation thereof.

The output of flip/flop 955, which is "high" every other state of the counter is provided to the enable inputs of counter 975. Counter 975 is a conventional, well-known device which operates as a 4-bit binary counter. It is connected so that its terminal count output RCO is applied via invertor 980 to its load control input, LD. Thus, after the counter reaches its terminal count it presets itself to the value determined by the number appearing at inputs A, B, C and D. Inputs A, B and C are connected to ground and input D is connected to the signal on lead ILT9M.

If there are less than eight processing elements in the computer system, lead ILT9M will have a "high" signal thereon as previously described. In this case, counter 975 is preset to the number eight and counts up to the number 16 whereupon it resets itself. If, on the other hand, there are more than eight processing elements the signal on lead ILT9M will be "low" and counter 975 starts counting from the number 0 and counts up to the number 16 thereupon it resets itself. Counter 975 counts under control of the IRCKEL clock signal.

The four outputs of counter 975 (QA–QD) are provided, via leads IBN0(14)-IBN3(14), as a binary-coded identification number for identifying the slave interface which is being selected for polling.

Gates 985, 990 and 994 and flip/flop 993 are used to generate a synchronization signal for synchronizing the slave interface units to the polling sequence. In particular, the condition where all of outputs QB–QD of counter 975 are "high" is detected by gate 985 which in turn applies a "low" signal to the upper input of gate 990 during the time when the IICl(15) timimng signal is "high". Under the condition where the output QA is also "low", gate 990 is enabled and "sets" flip/flop 993. The output of flip/flop 993 is, in turn, provided to buffer gate 994 and to output terminals 995 and 996 where it is used as a synchronization signal (over lines FEZTISYN and FEZTISYNR) to synchronize the operation of the slave interface units.

Additional control and synchronization signals are generated by the interrupt network control circuitry shown in FIG. 13. In particular, the circuitry shown in FIG. 13 selects whether an interrupt generated by a slave interface or an interrupt generated in response to an action of a processing element (an "internal" interrupt) is to be placed on the interrupt lines of the processor bus. This decision is made in accordance with a predetermined priority arrangement.

In particular the circuitry shown in FIG. 13 receives input signals generated in respons to commamds from the processing elements at its lefthand side. Specifically, a "high" signal is placed on lead IPFWLDI when the page fault word register is written or loaded (that is, if a processing element stores information in the page fault word register). Also, as previously described, a "low" signal is generated on lead (11)INEPR* if a new executive processor request has been detected when no executive processor request was pending previously. Alternatively, a "high" signal is placed on lead IECWLDI when a processing element writes information in the executive control word register.

A "high" signal on lead IPFWLDI is applied to gate 1325 which, in turn, "sets" flip/flop 1335 (the "K" input of flip/flop 1335 is connected to internal clearing signal ICLINTI which clears pending interrupts. The ICLINTI becomes "high", clearing flip/flops 1335 and 1340, when either the executive control word register or the page fault register is read by the processing elements). Alternatively, a "high" signal applied to the IECWLDI lead is applied to gate 1330 which, in turn, "sets" flip/flop 1340. Flip/flops 1335 and 1340 and the associated logic gates 1345 and 1350 make a "decision" as to whether the page fault register or the executive control word register has been written to.

Alternatively, both flip/flops 1335 and 1340 may be "set" if a new executive processor request is detected as signalled by a "low" signal on lead (11)INEPR*. The "low" signal on lead (11)INEPR* is applied to the clock input of flip/flop 1310 and causes the flip/flop to be set since its J and K inputs are connected to "high" and "low" sources, respectively. "Set" flip/flop 1310, in turn, applies a "high" signal to gate 1320. Gate 1320 also receives a signal from the Q* output of flip/flop 1335 at its upper input and a signal on lead IEPRINHI* at its lower input. The signal on lead IEPRINHI* is generated by the master interface internal sequence and control circuitry and is normally "high". A low signal appears on the lead when either the page fault word register or the executive control word register is being written to. The "low" signal inhibits the setting of flip/flop 1335 during these operation to prevent erroneous generation of timing signals. If flip/flop 1335 is not "set" indicating that a page fault interrupt is not pending, a "high" signal will appear at its Q* output enabling gate 1320 which, in turn, "sets" flip/flop 1335, via gate 1325, and "sets" flip/flop 1340, via gate 1330.

Gates 1345 and 1350 determine the type of internal interrupt which is being generated. In particular, if an executive processor request interrupt is to be generated, as previously described, both flip/flops 1335 and 1340 have been "set" and "low" signals appear at the Q* outputs of both flip/flops. These signals are applied to gate 1345 enabling it to generate a "high" signal on lead IEPRINI(15). This "high" signal is applied to the interrupt output circuitry (FIG. 15) to force the interrupt level code to an interrupt level 5 thereby allowing the executive processing element to respond.

Alternatively, if either flip/flop 1335 or 1340 is "set" (but not both) a "low" signal at its output enables gate 1350 which produces a "high" signal at its output, which "high" signal is applied to lead IINTFLI to inform the status circuitry that an internal interrupt is taking place.

In addition, the "high" signal at the output of gate 1350 is inverted by inverter 1355 and applied as a "low" signal to gates 1360 and 1365. The "low" signal, in combination with a "low" signal on clear lead ICLINTI produces a "low" signal at the output of gate 1365 which applies a "low" signal to the K input of flip/flop 1370. At this time, gate 1360 receives a "low" signal at its input from clear lead ICLINTI and therefore applies a "high" signal to the J input of flip/flop 1370. In response to clock signals appearing on clock lead IRCK*, flip/flop 1370 is "preset" to produce a "low" signal on its output Q* which "low" signal is applied to the output lead ISELEII(15). As will be hereinafter described, this signal is used by the interrupt control circuitry to select internal or external interrupt information for transmission on the processor interrupt bus lines. A "low" signal on this lead indicates the interrupt is "internal".

Alternatively, if neither flip/flops 1335 or 1340 are "set" indicating that no internal interrupts are pending, the "high" signals at their Q* outputs disable gate 1350 which, in turn, applies a "low" signal to inverter 1355 which, thereupon, applies a "high" signal to gates 1360 and 1365. Gate 1360 is thereby disabled and applies a "low" signal to the J input of flip/flop 1370. Gate 1365 is, in turn, enabled and applies a "high" signal to the K input of flip/flop 1370. During the appropriate clocking interval, flip/flop 1370 is "cleared" applying a "high" signal to the ISELEII(15) lead indicating external interrupt information is to be placed on the processor interrupt bus.

Some of the the interrupt synchronization and timing signals developed by the circuitry shown in FIGS. 9 and 13 is utilized by the interrupt prioritization circuit shown in FIG. 14. This circuit is driven by the polling signals produced by the polling interval generator shown in FIG. 9 and receives interrupt information in cyclical fashion from each slave interface. If a slave interface is, in fact, generating an interrupt, the new interrupt information is compared to the interrupt information already being processed by the interrupt circuitry by the prioritization circuitry and the new interrupt information is allowed to override the old interrupt information if it is of a higher level or if the new interrupt information is produced by the same device that produced the pending interrupt request.

In particular, interrupt information is received over the system bus from the slave interfaces via lines SZCIL1*, SZCIL2*, SZCID0*-SZCID3*, SZCIV0*-SZCIV3*, and SZCIP0*-SZCIP0* via terminals 1405-1426. Of these connections, lines SZCIL0*-SZCIL1* and terminals 1405 and 1410 contain a 2-bit code indicating the interrupt level of the incoming interrupt request. Lines SZCID0*-SZCID3* and terminals 1415-1418 contain a 4-bit identification code that identifies the memory element/bus adapter generating the interrupt (the associated slave interface is identified by its polling slot). Similarly, lines SZCIV0*-SZCIV3* and terminals 1419-1422 contain a 4-bit code indicating the interrupt vector and lines SZCIP0*-SZCIP3* (terminals 1423-1426) contain parity information bits for error correction.

The two interrupt level signals on terminals 1405 and 1410 are filtered by Schmitt-trigger threshold gates 1427 and 1428 and clocked into flip/flops 1445 and 1450 under control of the (9)IICI signal generated by the circuitry shown in FIG. 9. Similarly, the slave interface I.D. number on terminals 1415-1418 is clocked into 4-bit latch 1455 under control of the (9)IIC1 signal. The interrupt vector information on terminals 1419-1422 is clocked into latch 1460 and the parity information is clocked into latch 1465.

The information in flip/flops 1445 and 1450 and latches 1455-1465 is then compared with the current interrupt information stored in latches 1466-1474. In particular, the new level information stored in flip/flops 1455 and 1450 is provided to comparison circuit 1476 via leads INTL1 and INTL0. This level information is compared to level information previously stored in latch 1466 which is provided to comparison circuit 1476 via leads IIL1 and IIL0. Comparison circuit 1476 is a 4-bit magnitude comparator which is a conventional, commercial integrated circuit that compares the magnitude of the two level codes for the new and present interrupt information.

If the new in±ormation has a higher level, a "high" signal appears on output A]B of magnitude comparator 1476 which signal, in turn, enables gate 1480. Enabled gate 1480 thereupon produces a "low" output which is applied to the enable input of latches 1466-1474. Subsequently, the second enable input of latches 1466 and 1474 receives an enable signal from the (9)IIC2* lead generated by the circuitry shown in FIG. 9. The new imterrupt information is then clocked into latches 1466-1474 under control of the clock signal on lead IRCKEL and replaces the old information. The information in latches 1466-1474 is then made available on the internal master interface data bus for subsequent reading by the processing elements.

Similarly, the new interrupt information is allowed to replace the old information if the identity code of the new incoming information is equivalent to that previously stored indicating that the interrupt has been generated by the same device. In particular, the signals (9)IBN0-(9)IBN3 generated by the polling interval generator (FIG. 9) are applied to the "A" inputs of comparator 1478. The "B" inputs of comparator 1478 are provided with the slave interface I.D. information stored in latch 1468 (via signal lines IID4-IID7). If the I.D. numbers match, a "high" signal appears at the A=B output of comparator 1478 which signal enables gate 1480 which, in turn, allows the new information to be clocked in and override the old information in latches 1466-1474.

As with the master interface circuits previously described, the entire interrupt prioritization circuit may be reset if the master interface unit is no longer asserting executive control. In this case a "low" signal appears on lead (8)IEXECI generated b the circuitry shown in FIG. 8 which clears flip/flops 1445 and 1450 and latches 1455, 1460 and 1465. In addition, a "high" signal appears on the lead (8)IEXECJ* which clears latches 1466-1474.

The final circuitry portion which processes interrupt requests is the interrupt output circuitry shown in FIG. 15. Under control of the synchronization and timing signals developed by the circuitry shown in FIGS. 9 and 13, this circuitry transfers information from either the page fault word register, the executive control word register, or the external interrupt register onto the master interface internal data bus for forwarding to the processor bus for reading by the processing elements. This circuit receives information via the master interface internal data bus from the page fault word registers (the "W" and "V" halves, one half of which is shown in FIG. 12).

In particular, information appearing on the internal data bus from the page fault word register and executive control word register 1500 is provided to 4-bit multiplexers 1505-1510. Multiplexer 1505 is a dual 4-bit multiplexer and mutliplexers 1506-1510 are single multiplexers. Each of the multiplexers has four inputs labelled 1C0-1C3 (multiplexer 1505 has an additional set of inputs 2C0-2C3) which are connectable under control of selection signals appearing on selection inputs A and B to the output 1Y (in the case of dual multiplexer 1505 there are two such outputs, 1Y and 2Y).

Selection inputs A and B are, in turn, controlled by the signals appearing on leads IAI* and (13)ISELECI. As previously mentioned, the logical value of the signal IAI* depends on the physical electrical connector into which the master interface unit is plugged. The signal on lead (13)ISELECI is generated by the circuitry shown in FIG. 13 and is "high" when an executive control word has been loaded or a new processor executive request has been received. A "high" signal on the (13)ISELECI lead applied to the A selection input of multiplexers 1505-1510 causes the signals at either the C2 or C3 inputs to be connected to the multiplexer outputs. The choice between between the C2 or the C3 inputs is determined on the IAI* lead. In the case of mutliplexer 1505, therefore, the information in the executive control word register position N0 of the executive control word register is selected depending on which position the master interface unit is plugged into. This section of the executive control word register is used to store the interrupt level of the interrupt to be generated during a transfer of executive control. However, the information in the executive control register may be overridden by a "high" signal on lead (13)IEPRINI which forces both inputs 1Y and 2Y to be "low" thereby forcing the output level to level 5.

Similarly, multiplexers 1506-1510 are controlled by the signals on leads IAI* and (13)ISELECI to connect either information from the page fault word register or the exeutive control word register to their outputs.

Outputs 1Y and 2Y of multiplexer 1505 are provided to inputs 3A and 4A of two-bit multiplexer 1520. The output of multiplexer 1506 is connected to inputs 1A and 2A of multiplexer 1525 and the outputs of multiplexers 1507-1510 are connected to inputs 1A and 3A of multiplexers 1530 and 1535, respectively.

Multiplexers 1520-1535 are used to select whether external or internal interrupt information will be forwarded to the processor bus. In particular, multiplexers 1520-1535 are controlled by a selection signal generated on lead (13)ISELEII. As previously described, this selection signal is generated by the previously described interrupt control circuitry and is "low" if there is a internal interrupt (generated in response to the writing of the page fault word or the executive control register) and is "high" if there is to be an external interrupt using information received from the slave interfaces.

A "low" signal applied to multiplexers 1520-1535 causes their A inputs to connected to their outputs. Thus, internal interrupt information from the executive control word register or the page fault word register (as determined by multiplexers 1505-1510) is gated to latches 1545-1560. On the other hand, if the signal on lead (13)ISELEII is "high" then external interrupt information, consisting of level information on leads (14)IIL0*-(14)IIL1; interrupt vector information on leads (14)IIV0*-(14)IIV3; external slave interface identification information on leads (14)IID4-(14)IID7 and memory element/bus adapter identification information on leads (14)IID0-(14)IID3 is passed through multiplexers 1520-1535.

The selected information is clocked into latch circuits 1545-1560 by means of a clock signal appearing on lead (9)IPBTCK.

Interrupt information provided at the outputs of latch circuits 1545-1560 is, in turn, provided to driver gates 1570-1585 for forwarding to the processing elements, via terminals 1586-1599.

Although only one illustrative embodiment of the invention has bee described herein various modifications and changes will be apparent to those skilled in the art which modifications and changes are intended to be within the spirit and scope of the invention claimed herein.

What is claimed is:

1. A computer system comprising,
a plurality of processing elements for simultaneously performing data processing calculations for a plurality of data processing tasks, each of said processing elements performing data processing calculations for one data processing task independently from other data processing elements, said processing element generating request signals;
a common memory area having a plurality of storage locations, each of said plurality of storage locations being accessible by all of said processing elements;
a system bus for transferring signals between said processing elements and said memory area;
at least one processor bus connected to at least one of said plurality of processing elements; and
first arbitration means responsive to request signals generated from at least one of said processing elements for selectively transferring signals between said processor bus and said system bus.

2. A computer system in accordance with claim 1 wherein said first arbitration means further comprises means responsive to said processor request signals for selecting one of said processors.

3. A computer system in accordance with claim 1 wherein said first arbitration means further comprises means responsive to said processor request signals for transferring data signals between said one selected processor and said system bus.

4. A computer system in accordance with claim 1 wherein said common memory area is comprised of a plurality of separate memory elements and said computer system further comprises at least one memory bus connected to at least one of said plurality of memory elements.

5. A computer system in accordance with claim 1 wherein said first arbitration means further comprises means responsive to said processor request signals for transferring address signals selecting one of said memories between said one selected processor and said system bus.

6. A computer system in accordance with claim 5 further comprising slave interface means responsive to said address signals for transferring data between said system bus and said one selected memory.

7. A computer system in accordance with claim 6 wherein each of said memory elements comprises means for generating interrupt signals indicating a fault situtation and said slave interface comprises means responsive to said interrupt signals for generating a service request interrupt signal and means responsive to said interrupt signals for selecting one of said plurality of memory elements.

8. A computer system in accordance with claim 1 further comprising second arbitration means controlled by said first arbitration means for selectively transferring control signals between said memory bus and said system bus.

9. A computer system in accordance with claim 8 wherein said second arbitration means comprises a plurality of slave interfaces, each of said plurality of slave interfaces being connected to one of said plurality of memory buses.

10. A computer system in accordance with claim 9 wherein said first arbitration means comprises means responsive to service request interrupt signals generated by said plurality of slave interfaces for selecting one of said slave interfaces to transfer signals from a selected memory element to said system bus and means for transferring signals from the memory bus connected to said selected memory element to said system bus.

11. A computer system in accordance with claim 9 wherein said first arbitration means comprises means responsive to signals on said system bus generated by a selected memory element for transferring said signals on said system bus to said processor bus.

12. A computer system in accordance with claim 1 wherein said common memory area further comprises a plurality of memory buses, each of said plurality of memory buses being connected to at least one of said plurality of memory elements.

13. A computer system in accordance with claim 12 further comprising at least one peripheral element and bus adapter means for connecting said peripheral unit to one of said memory buses.

14. A computer system in accordance with claim 1 further comprising a plurality of processor buses, each of said plurality of processor buses being connected to at least one of said plurality of processors.

15. A computer system comprising,
a plurality of processing elements for simultaneously performing data processing calculations for a plurality of data processing tasks, each of said processing elements performing data processing calculations for one data processing task independently from other data processing elements, said processing element generating request signals;

a plurality of separate memory elements;

at least one memory bus connected to at least one of said plurality of memory elements;

a system bus for transferring signals between said processing elements and one of said plurality of memory elements;

at least one processor bus connected to at least one of said plurality of processing elements; and first arbitration means responsive to request signals generated from at least one of said processing elements for selecting one of said processors and for selectively transferring signals between said processor bus and said system bus;

slave interface means responsive to said address signals selecting one of said memories, said address signals being by said one selected processor for transferring data between said system bus and said one selected memory.

16. A computer system in accordance with claim 15 wherein each of said memory elements comprises means for generating interrupt signals indicating a fault situation and said slave interface means comprises means responsive to said interrupt signals for generating a service request interrupt signal and means responsive to said interrupt signals for selecting one of said plurality of memory elements.

17. A computer system in accordance with claim 16 further comprising second arbitration means controlled by said first arbitration means for selectively transferring control signals between said memory bus and said system bus.

18. A computer system in accordance with claim 17 further comprising a plurality of slave interfaces, each of said plurality of slave interfaces being connected to one of said plurality of memory buses.

19. A computer system in accordance with claim 18 wherein said first arbitration means comprises means responsive to service request interrupt signals generated by said plurality of slave interfaces for selecting one of said slave interfaces to transfer signals from a selected memory element to said system bus and means for transferring signals from the memory bus connected to said selected memory element to said system bus.

20. A computer system in accordance with claim 19 wherein said first arbitration means comprises means responsive to signals on said system bus generated by a selected memory element for transferring said signals on said system bus to said processor bus.

21. A computer system in accordance with claim 20 wherein said common memory area further comprises a plurality of memory buses, each of said plurality of memory buses being connected to at least one of said plurality of memory elements.

22. A computer system in accordance with claim 21 further comprising at least one peripheral element and bus adapter means for connecting said peripheral unit to one of said memory buses.

23. A computer system in accordance with claim 21 wherein said bus adapter means comprises means for generating interrupt signals indicating that said peripheral unit is requesting service.

24. A computer system in accordance with claim 23 further comprising a plurality of processor buses, each of said plurality of processor buses being connected to at least one of said plurality of processors.

* * * * *